US011000945B2

(12) United States Patent
Asada et al.

(10) Patent No.: US 11,000,945 B2
(45) Date of Patent: May 11, 2021

(54) WEARABLE ROBOTIC SYSTEMS FOR SUPPORTING A LOAD

(71) Applicant: Massachusetts Institute of Technology, Cambridge, MA (US)

(72) Inventors: Haruhiko Harry Asada, Lincoln, MA (US); Daniel J. Gonzalez, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 383 days.

(21) Appl. No.: 16/020,823

(22) Filed: Jun. 27, 2018

(65) Prior Publication Data

US 2018/0370021 A1 Dec. 27, 2018

Related U.S. Application Data

(60) Provisional application No. 62/525,503, filed on Jun. 27, 2017.

(51) Int. Cl.
*B25J 9/00* (2006.01)
*B25J 13/02* (2006.01)
*B25J 9/16* (2006.01)

(52) U.S. Cl.
CPC ............ *B25J 9/0006* (2013.01); *B25J 9/1664* (2013.01); *B25J 13/02* (2013.01)

(58) Field of Classification Search
CPC ........ B25J 9/0006; B25J 9/1664; B25J 13/02; A61H 3/00; A61H 3/008; A61H 1/0229;
(Continued)

(56) References Cited

U.S. PATENT DOCUMENTS 5,013,510 A 7/1991 Krauter
5,587,937 A 12/1996 Massie et al.
(Continued)

FOREIGN PATENT DOCUMENTS

EP 3196484 A1 7/2017
JP 11-309184 A 11/1999
(Continued)

OTHER PUBLICATIONS

International Search Report and Written Opinion dated Sep. 20, 2018 for Application No. PCT/US2018/039727.
(Continued)

*Primary Examiner* — Dale Moyer
(74) *Attorney, Agent, or Firm* — Wolf, Greenfield & Sacks, P.C.

(57) ABSTRACT

Wearable robotic systems including robotic limbs for supporting a load while a user moves through an environment and their methods of use are described. In one embodiment, a robotic system includes robotic limbs with first and second robotic limb segments that are movable between different configurations to support a load while a user is standing or crawling. In another embodiment, a robotic system includes first and second robotic limbs that are substantially located within a plane parallel to a frontal plane of a user when the robotic system is worn. In another embodiment, a wearable robotic system includes first and second robotic limbs and an associated base that is attachable to a user's torso. The first and second robotic limbs may include a plurality of actuators and associated robotic limb segments to couple the robotic legs to the base and control their movement.

41 Claims, 10 Drawing Sheets

(58) Field of Classification Search
CPC .................. B62D 57/02; B62D 57/032; G05B 2219/40305; A61F 5/028
See application file for complete search history.

(56) References Cited

U.S. PATENT DOCUMENTS

| | | | |
|---|---|---|---|
| 7,857,774 B2 | 12/2010 | Sankai | |
| 8,731,738 B2 | 5/2014 | Agrawal et al. | |
| 9,198,821 B2 | 12/2015 | Unluhisarcikli et al. | |
| 9,351,900 B2 | 5/2016 | Walsh et al. | |
| 9,381,642 B2 | 7/2016 | Asada et al. | |
| 9,381,961 B1* | 7/2016 | Kataoka | B62D 57/032 |
| 9,719,633 B2 | 8/2017 | Sacksteder | |
| 9,789,603 B2 | 10/2017 | Jacobsen et al. | |
| 9,808,073 B1 | 11/2017 | Maxwell et al. | |
| 10,098,778 B1* | 10/2018 | Asada | A61H 1/0229 |
| 10,118,291 B2 | 11/2018 | Asada et al. | |
| 2010/0113980 A1 | 5/2010 | Herr et al. | |
| 2011/0082566 A1 | 4/2011 | Herr et al. | |
| 2012/0059548 A1 | 3/2012 | Agrawal et al. | |
| 2012/0328395 A1 | 12/2012 | Jacobsen et al. | |
| 2013/0226048 A1 | 8/2013 | Unluhisarcikli et al. | |
| 2014/0012164 A1 | 1/2014 | Tanaka | |
| 2014/0346316 A1* | 11/2014 | Sitzmann | A47C 16/00 248/688 |
| 2015/0001269 A1 | 1/2015 | Sacksteder | |
| 2015/0134078 A1* | 5/2015 | Amundson | A61H 3/061 623/24 |
| 2015/0173993 A1 | 6/2015 | Walsh et al. | |
| 2015/0209215 A1 | 7/2015 | Lee et al. | |
| 2015/0217444 A1* | 8/2015 | Asada | B25J 9/0006 700/258 |
| 2015/0272809 A1 | 10/2015 | Accoto et al. | |
| 2016/0030201 A1 | 2/2016 | Zoss et al. | |
| 2016/0096268 A1 | 4/2016 | Genani | |
| 2016/0101012 A1* | 4/2016 | Hsiao-Wecksler | A61H 3/02 135/71 |
| 2016/0107309 A1 | 4/2016 | Walsh et al. | |
| 2016/0270997 A1 | 9/2016 | Little et al. | |
| 2016/0346156 A1 | 12/2016 | Walsh et al. | |
| 2017/0087721 A1* | 3/2017 | Asada | A47C 9/025 |
| 2017/0165833 A1 | 6/2017 | Park et al. | |
| 2017/0231787 A1 | 8/2017 | Noda et al. | |
| 2018/0111261 A1* | 4/2018 | Asada | B25J 9/1697 |

FOREIGN PATENT DOCUMENTS

| | | |
|---|---|---|
| JP | 2005-245637 A | 9/2005 |
| JP | 2007-075974 A | 3/2007 |
| JP | 2008-026620 A | 2/2008 |
| JP | 2012-135486 A | 7/2012 |
| JP | 2013-022091 A | 2/2013 |
| JP | 2014-512976 A | 5/2014 |
| JP | 2014-128724 A | 7/2014 |
| JP | 2015-217159 A | 12/2015 |
| WO | WO 2012/149446 A2 | 11/2012 |
| WO | WO 2012/154580 A1 | 11/2012 |
| WO | WO 2015/174998 A1 | 11/2015 |
| WO | WO 2016/039140 A1 | 3/2016 |
| WO | WO 2016/172002 A1 | 10/2016 |

OTHER PUBLICATIONS

International Search Report and Written Opinion dated May 24, 2017 for Application No. PCT/US2017/021728.
International Preliminary Report on Patentability dated Sep. 20, 2018 for Application No. PCT/US2017/021728.
No Author Listed, NIOSH, OSHA, USCG, and EPA, Occupational Safety and Health Guidance Manual for Hazardous Waste Site Activities. Washington, DC. Oct. 1985. 198 pages.
No Author Listed, Veskimo Personal Cooling Systems, 4.4 Quart Hydration Backpack summary, features, and specifications. Accessed online Feb. 20, 2019 via the Wayback Machine, website hits on May 11, 2017 and Jun. 12, 2017. https://web.archive.org/web/20170511094624/http://www.veskimo.com/personal-cooling . . . 2 pages.
No Author Listed, Bureau of Labor Statistics. Economic News Release. Nonfatal Occupation Injuries and Illnesses Requiring Days Away From Work New Release. USDL 15-2205. Nov. 19, 2015. Accessed online Feb. 20, 2019, https://www.bls.gov/news.release/archives/osh2_11192015.htm. 21 pages.
No Author Listed, Bureau of Labor Statistics. News Release. Employer-Reported Workplace Injuries and Illnesses—2015, USDL-16/2056. Oct. 27, 2016. Accessed online Feb. 20, 2019 at https://www.bls.gov/news.release/archives/osh_10272016. 28 pages.
No Author Listed, Visual Interpretation of the International Residential Code. 2006 Stair Building Code. Stairway Manufacturers' Association, Technical Report. 16 pages.
Alexander, The gaits of bipedal and quadrupedal animals. The Int J Robotics Res. Jun. 1984;3(2):49-59.
Ayaz et al., A human-like approach to footstep planning. Ch. 15 in Humanoid Robots: Human-like Machines. Ed. by Hackel, M. Jun. 2007; pp. 295-314. Epub Jun. 1, 2007. Available from http://www.intechopen.com/books/humanoid_robots_human_like_machines/a_human-like_approach_to_footstep_planning.
Bechon et al., Synchronization and quorum sensing in a swarm of humanoid robots. 2012; pp. 1-5. http://arxiv.org/abs/1205.2952. orig version May 2012; this version May 27, 2013.
Bogue, Exoskeletons and robotic prosthetics: a review of recent developments. Industrial Robot: An International Journal. 2009;36(5):421-427.
Chen et al., Recent developments and challenges of lower extremity exoskeletons. J Orthopaedic Translation. 2016;5:26-37. Epub Oct. 17, 2015.
Chung et al., Cooperative robot control and concurrent synchronization of Lagrangian systems. 2009 IEEE Transactions on Robotics. Jun. 2009;25(3):686-700.
Davis, Hazmat training exercise. 2013 [Online]. Available: http://www.dvidshub.net/image/1031105/hazmat-training-exercise. 3 pages.
Dollar et al., Lower extremity exoskeletons and active orthoses: Challenges and state-of-the-art. IEEE Transactions on Robotics. Feb. 2008;24(1):144-58.
Ernat et al., Incidence and risk factors for acute low back pain in active duty infantry. Mil Med. Nov. 2012; vol. 177, 11:1348-51.
Girard et al., A two-speed actuator for robotics with fast seamless gear shifting. 2015 IEEE/RSJ Intl Conf on Intelligent Robots and Systems (IROS). Hamburg, Germany, Sep. 28-Oct. 2, 2015. pp. 4704-4711.
Gonzalez et al., Design of extra robotic legs for augmenting human payload capabilities by exploiting singularity and torque redistribution. 2018 IEEE/RSJ Int Conf on Intelligent Robots and Systems (IROS 2018). Oct. 1-5, 2018. Madrid, Spain. pp. 4348-4354.
Griffin et al., Biomechanics of quadrupedal walking: How do four-legged animals achieve inverted pendulum-like movements? J Exper Biol. Sep. 2004;207(20):3545-58.
Hirai et al., The development of Honda humanoid robot. Proc 1988 IEEE Int Conf Robotics & Automation (ICRA 1998), Leuven, Belgium, May 1998. pp. 1321-1326.
Kenneally, Design principles for a family of direct-drive legged robots design principles for a family of direct-drive legged robots. IEEE Robotics and Automation Letters. Jul. 2016;1(2):900-7. Epub Feb. 11, 2016.
Kurek et al., The MantisBot: Design and impedance control of supernumerary robotic limbs for near-ground work. 2017 IEEE Intl Conf Robotics and Automation (ICRA 2017). May 29-Jun. 3, 2017. Singapore. pp. 5942-5947.
Lee et al., Summary of human ankle mechanical impedance during walking. IEEE J Transl Eng Health Med. Sep. 19, 2016;4:2100407(1-7). Accessed online at http://www.ncbi/nlm.nig.gov/pmc/articles/PMC5067112. 16 pages.
Leigh, Economic burden of occupational injury and illness in the United States. The Milbank Quarterly. Dec. 2011;89(4):728-72.
Llorens-Bonilla et al., A robot on the shoulder: Coordinated human-wearable robot control using coloured petri nets and partial least

(56) References Cited

OTHER PUBLICATIONS squares predictions. 2014 IEEE International Conference on Robotics and Automation (ICRA 2014), Hong Kong, China, May 31-Jun. 7, 2014; pp. 119-125.

Lohmiller et al., On contraction analysis for non-linear systems. Automatica. 1998;34(6):683-696.

Matsubara et al., Spatio-temporal synchronization of periodic movements by style-phase adaptation: Application to biped walking. 2012 Proc IEEE Int Conf on Robotics and Automation (ICRA 2012), Saint Paul, Minnesota, May 14-18, 2012, pp. 524-530.

McGhee et al., On the stability properties of quadruped creeping gaits. Math Biosci. Aug. 1968;3(1-2):331-51.

Mukovskiy et al., Design of the dynamic stability properties of the collective behavior of articulated bipeds. 2010 10$^{th}$ IEEE-RAS Int Conf on Humanoid Robots. Dec. 6-8, 2010, Nashville, TN. pp. 66-73.

Parietti et al., Design and control of supernumerary robotic limbs for balance augmentation. 2015 IEEE Intl Conf on Robotics and Automation (ICRA 2015). Conf. Seattle, Washington. May 26-30, 2015. pp. 5010-5017. Pub Jul. 2, 2015. doi: 10.1109/ICRA2015.7139896.

Parietti, Design and control of supernumerary robotic limbs. Doctoral Thesis Dissertation, Department of Mechanical Engineering, Massachusetts Institute of Technology, Sep. 2016. 181 pages.

Parietti et al., Supernumerary robotic limbs for human body support. IEEE Transactions on Robotics. Apr. 2016;32(2):301-11. Date of initial pub Feb. 18, 2016.

Parietti et al., Reactive balance control in walking based on a bipedal linear inverted pendulum model. Proc 2011 IEEE Int Conf on Robotics and Automation (ICRA 2011). May 9-13, 2011. Shanghai, China. pp. 5442-5447.

Ramos et al., Robot-human balance state transfer during full-body humanoid teleoperation using divergent component of motion dynamics. 2016 Proc Int Conf on Robotics (ICRA 2016). May 16-21, 2016. Stockholm, Sweden. pp. 1587-1592.

Ruiz, Design and Analysis of a Stewart-Platform-Based Six-Axis Load Cell. Bachelor of Science Thesis, Massachusetts Institute of Technology. Jun. 2017. 43 pages.

Santschi et al., Moments of inertia and centers of gravity of the living human body. Behavioral Sciences Laboratory, Air Force Systems Command, Technical Documentary Report #AMRL-TDR-63-36. May 1963. 70 pages.

Svinin et al., Optimal geometric structures of force/torque sensors. The Int J Robotics Res. Dec. 1, 1995;14(6):560-73.

Wensing et al., Proprioceptive actuator design in the MIT cheetah: Impact mitigation and high-bandwidth physical interaction for dynamic legged robots. Jan. 2017. IEEE Transactions on Robotics. pp. (99):1-14.

Westervelt et al., Hybrid zero dynamics of planar biped walkers. 2003 IEEE Transactions on Automatic Control. Jan. 2003;48(1):42-56.

Wu et al., Implicit and intuitive grasp posture control for wearable robotic fingers: A data-driven method using partial least squares. IEEE Transactions on Robotics. Feb. 2016;32(1):176-86. Date of initial pub Jan. 7, 2016.

\* cited by examiner

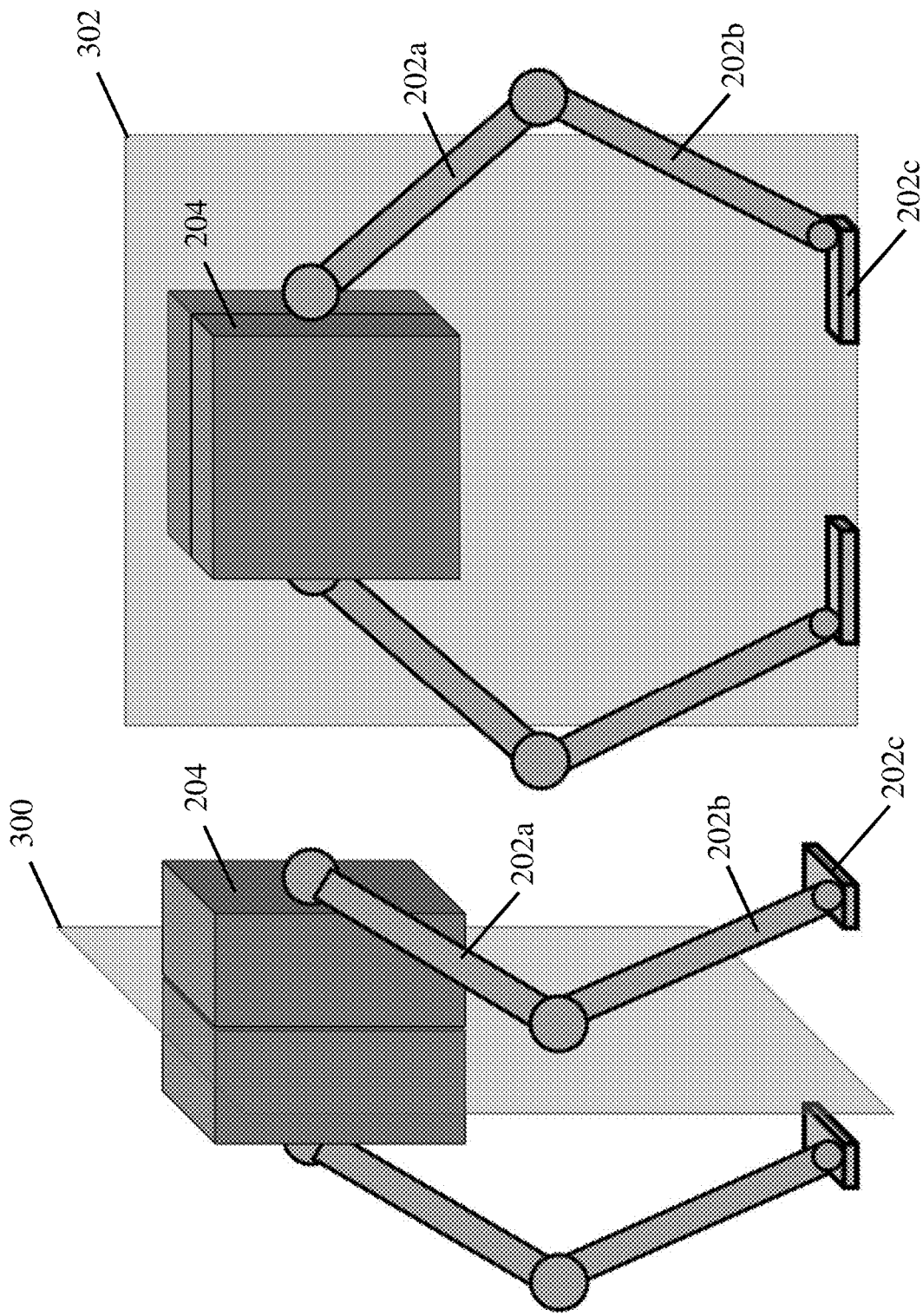

WEARABLE ROBOTIC SYSTEMS FOR SUPPORTING A LOAD

CROSS-REFERENCE TO RELATED APPLICATIONS

This application claims the benefit under 35 U.S.C. § 119(e) of U.S. provisional application Ser. No. 62/525,503, filed Jun. 27, 2017, the disclosure of which is incorporated by reference in its entirety.

GOVERNMENT LICENSE RIGHTS

This invention was made with Government support under Grant No. DE-EM0004484 awarded by the Department of Energy. The Government has certain rights in the invention.

FIELD

Disclosed embodiments are related to wearable robotic systems for supporting a load.

BACKGROUND

Nuclear decommissioning workers that enter areas contaminated with radioactive or other hazardous material wear Personal Protection Equipment (PPE) such as Hazmat suits and carry Self-Contained Breathing Apparatuses (SCBA). These suits and SCBA tanks limit the amount of time a worker may stay in the working area. Typically, 13.6-kilogram (30-pound) Aluminum SCBA systems are currently used on site and last only 30 minutes. While 30 minutes may be enough time to arrive to a task location, perform the task, and return to a decontamination station, heat exhaustion usually sets in before the tank can be depleted of air. Therefore, while larger and heavier air tanks may allow more air to be carried at a time, the increased loads associated with these tanks would only cause a worker to fatigue faster due to the effort required to carry around the added weight.

To help address the above limited duration during which workers may perform a task, tethered body cooling systems have been tested to little success due to the presence of unsafe exposed hoses and cables which may present a tripping and snag hazard to workers. Self-contained body cooling systems which have also been tested may help to address heat exhaustion and snag issues. However, these cooling systems still add more weight that a person must carry (approximately 5.3 kilograms, or 11.7 pounds, for the Veskimo Hydration Backpack) which may again lead to faster worker fatigue.

In addition to heavy loads and heat exhaustion, workers may also face injury from poor body posture. Manual tasks in manufacturing and industrial settings, including decontamination work at nuclear facilities, often results in workers assuming fatiguing positions near the ground. When performing these tasks, workers may kneel or crouch in potentially painful postures while sometimes using their arms to stabilize and support themselves while also sharply bending at the knee and back to reach the ground and balance. These issues are compounded when workers are wearing heavy PPE. Taking such ergonomically challenging postures for long periods of time may lead to injuries in the lower back, knees, and ankles. This situation applies to many different industries including, for example, construction, manufacturing, transportation, logistics, defense, and agriculture, to name a few. According to the US Bureau of Labor Statistics, there were over 190,000 workplace injuries in manufacturing sectors, and 50,000 injuries in agriculture in 2014. Overall, the cost of workplace injury amounted to over $190 billion in lost productivity and over 1.1 million lost days of work. Out of all workplace injuries in 2014, approximately one in three was a musculoskeletal disorder. In 2010, the average civilian worker's compensation claim due to a back injury in the USA was between $40,000 and $80,000.

SUMMARY

In one embodiment, a robotic system includes a first robotic limb and a second robotic limb. The first and second robotic limbs are configured to be attached to a user's body. When the robotic system is worn, the first and second robotic limbs are configured to extend towards and contact a surface proximate the user to support a load applied to the robotic system relative to the surface. Each of the first and second robotic limbs include a first limb segment with a first length and a second limb segment with a second length. The first limb segment is selectively movable between a first position and a second position relative to the second limb segment. When the first limb segments of the first and second robotic limbs are located in the first position the robotic system is configured to support the load when the user is in a first posture relative to the surface. Additionally, wherein when the first limb segments of the first and second robotic limbs are in the second position the robotic system is configured to support the load when the user is in a second posture relative to the surface.

In another embodiment, a method for supporting a load with a robotic system attached to a user's body includes: supporting the load with at least first and second robotic limbs in contact with a surface proximate the user; and moving a first limb segment of each robotic limb relative to a second limb segment of each robotic limb from a first position to a second position when the user transitions between a first posture relative to the surface and a second posture relative to the surface.

In yet another embodiment, a robotic system includes at least first and second robotic limbs configured to be attached to a user's body. When the robotic system is worn, the first and second robotic limbs are configured to extend towards and contact a surface proximate the user to support a load applied to the robotic system relative to the surface. In at least one operating mode the first robotic limb and the second robotic limb are disposed within a plane parallel to a frontal plane of the user when worn.

In still another embodiment, a robotic system includes a base configured to be attached to a user's body as well as a first robotic limb and a second robotic limb. When the robotic system is worn, the first and second robotic limbs are configured to extend towards and contact a surface proximate the user to support a load applied to the robotic system relative to the surface. Each of the first and second robotic limbs include a first actuator operatively coupled to the base, a first limb segment operatively coupled to the first actuator, a second actuator operatively coupled to the first limb segment, and a second limb segment operatively coupled to the second actuator.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 5 is a schematic representation of a robotic system including robotic limbs that are disposed in planes that are parallel to a sagittal plane of a user when worn;

FIG. 6 is a schematic representation of a robotic system including robotic limbs that are disposed in a plane that is parallel to a frontal plane of a user when worn;

DETAILED DESCRIPTION

Figure 1:
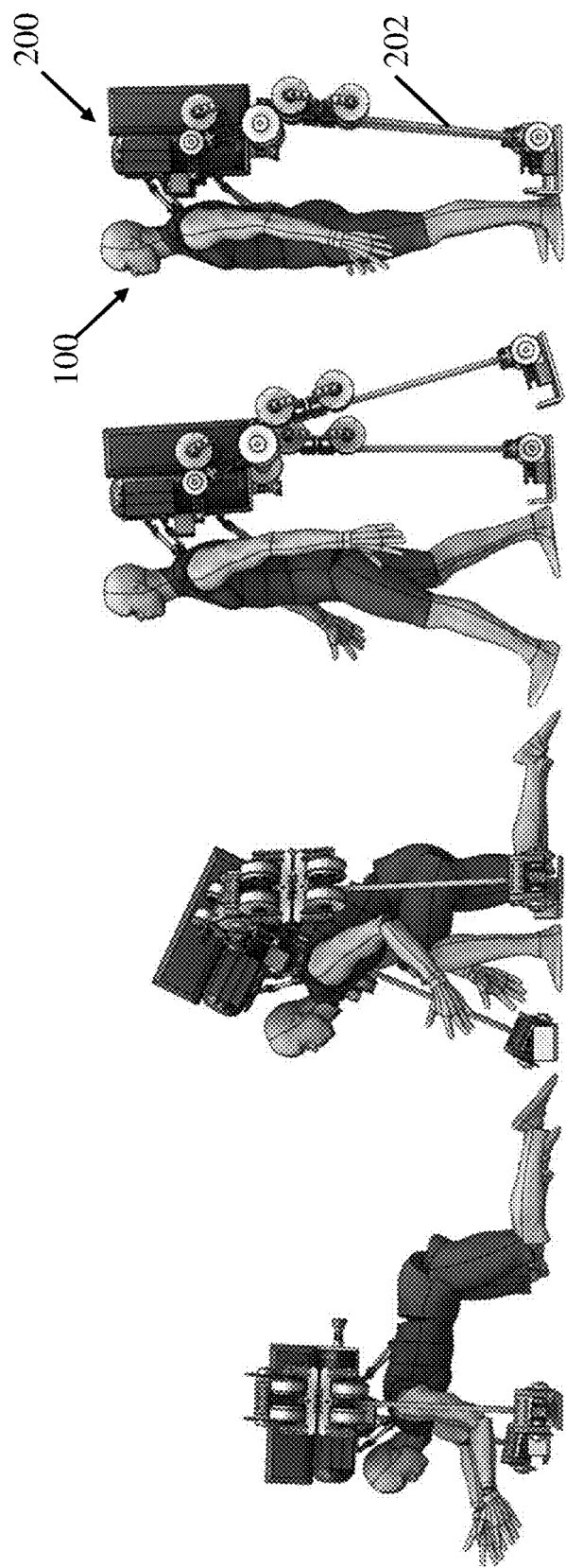
FIG. 1 is a schematic representation of a person wearing a wearable robotic system transitioning between a standing, standing walking, crouching, and crawling position.

While a multitude of exoskeletons have been developed for strength augmentation, the Inventors have recognized that these exoskeletons are tied to the kinematics of the operator. Thus, these exoskeletons are limited to the same movement range as the operator when providing support. Accordingly, when the operator is taking kinematically unfavorable configurations, such as squatting and crouching, the exoskeleton is also in a kinematically unfavorable configuration due to their similar structures. Postures that are infeasible for a person to maintain on their own, such as leaning forward while crawling on the floor with no hands, are also infeasible despite wearing an exoskeleton due to the exoskeleton simply augmenting the user's force capabilities while failing to compensate for the structural deficit. In contrast, unlike an exoskeleton, Supernumerary Robotic Limbs (SRLs) are not kinematically tied to the operator's limbs, but instead take independent structural configurations to assist a user.

In view of the above, the Inventors have recognized the benefits associated with a wearable robotic system that moves with a user to assist the user in supporting at least a portion of the user's weight and/or at least a portion of the weight of a payload for the user. The wearable robotic system may help support either one or both of these loads relative to a surface proximate a user when the user is located in a variety of different postures relative to that surface. For example, a wearable robotic system may help to support these loads when the user is moving, transitioning between various postures, and/or while maintaining various postures, including, for example, standing, walking, crouching crawling, transitioning between standing and crawling, as well as any number of other types of movement and/or postures. Such a robotic system may help a user to perform a better job, enable certain postures of a user, increase the load capacity of a user, and/or reduce user fatigue. However, embodiments in which benefits other than those noted above are realized are also contemplated as the disclosure is not limited to these particular benefits.

In some embodiments, it may be desirable to support a load in two or more configurations with minimal energy expenditure. For example, a wearable robotic system may be configured to support a load in both a standing configuration and crawling configuration to aid a user while they are standing and/or crawling. Specifically, in one embodiment, an wearable robotic system may include first and second robotic limbs that are configured to be attached to a user's body. When the wearable robotic system is worn, the robotic limbs may extend towards and contact a surface proximate the user, such as a surface the user is located on, in order to support the load applied to the robotic system. To enable an energetically favorable configuration of the system for supporting the applied load when the user is in two or more postures, such as a standing and/or crawling configuration, the robotic limbs may include a first limb segment with the first length and a second limb segment with a second length moveably attached to the first limb segment. When a user transitions between the two or more postures relative to the underlying surface, the first limb segment may be selectively moved between a first position and a second position relative to the second limb segment to selectively transition the robotic limbs between an extended configuration and a retracted configuration. Such an arrangement may be appropriate for transitioning between standing and crawling postures though other postures relative to the surface may also be used. The relative lengths of the first and second limb segments may be selected such that moving the first limb segment between the first and second positions appropriately positions the portion of the robotic system attached to the user at a height and orientation relative to an underlying surface to maintain the user in a natural posture as may occur when standing or crawling.

In some embodiments, a robotic limb of a wearable robotic system may include a first limb segment that may be rotated relative to the second limb segment. When the first limb segment is rotated to the first position, the first and second limb segments may be in an extended configuration such that the first limb segment extends at least partially in a vertical upwards direction away from the second limb segment and a surface proximate the user and robotic system when the robotic system is worn. Such a configuration may correspond to a maximum robotic leg length, and the robotic system may be in a standing configuration to support an applied load while a user is standing or in another appropriate posture. Correspondingly, when the first limb segment is located in the second position, the first limb segment may extend at least partially in a vertical downwards direction away from the second limb segment and towards the surface underlying the user and robotic system when the robotic system is worn. When configured in this manner, the robotic system may be in a crawling, or other appropriate, configuration to support a load while a user in that posture. This configuration of the limb segments may also correspond to a minimum robotic leg length.

In some instances, it may be desirable for a robotic system to move in sync with a user while the user is traversing stairs. In such an embodiment, it may be desirable to increase an overall length of the robotic limbs of the robotic system to take into account the additional height of the stairs. This may permit a user to assume a more natural posture while traversing the stairs while the robotic system follows behind and/or below the user without dragging the user down. Similar to the above embodiments, the robotic system may include at least first and second robotic limbs. Additionally, in some embodiments, each of the robotic limbs may include first, second, and third limb segments that may be moved relative to each other to traverse the stairs in sync with the user. For example, the third limb segment may correspond to a foot of a robotic limb that may be moved between a first retracted position and a second extended position. The first retracted position may correspond to the third limb segment being positioned in a roughly horizontal orientation relative to an underlying surface proximate the user. The second extended position may correspond to the third limb segment being rotated relative to the second limb segment such that it is in an extend configuration which may be oriented in a substantially vertically downward direction relative to an underlying surface proximate the user and robotic system. The additional length added to the robotic limb by the third limb segment in the second extended position as compared to the first retracted position may correspond to a stair height of the stairs being traversed by the user. Accordingly, a robotic limb may have a first length when the third limb segment is in the first retracted position and a second length that is greater than the first length when the third limb segment is in the second extended position. A difference between the first and second lengths may be equal to the third limb segment length and/or a stair height. Accordingly, the robotic limb segments of each robotic limb may be appropriately positioned relative to each other such that the overall length of a robotic limb may be adjusted while a user traverses stairs to selectively increase and/or decrease an overall length of the robotic limbs by a length that is approximately equal to a stair height to aid a user when traversing stairs.

In the above embodiments, the first and second limb segments may have any appropriate combination of lengths. However, in embodiments where the desired operating modes include standing and crawling, the first and second limb segments may exhibit a desired combination of lengths to provide a desired robotic limb length in the various positions for supporting a load while a user is in a standing and/or crawling position. In some embodiments, a maximum robotic leg length may be approximately equal to the height of a person's shoulder. Such a height may correspond approximately to a total length of the combined first and second limb segments that is between about 40 inches and 60 inches for individuals between the height of about 4.5 feet and 6.5 feet. To properly position a connection between the robotic limbs and a user's torso at a height appropriate for crawling, a ratio of the first limb segment length and the second limb segment length may be between or equal to ⅛ and ½, 3/16 and ⅜, 3/16 and 5/16, and/or any other appropriate range of ratios. In some embodiments, a ratio of the first limb segment length and the second limb segment length may be ¼. Accordingly, in some embodiments, the first limb segment length may be between or equal to about 5 inches and 20 inches, 5 inches and 15 inches, and or any other appropriate length as the disclosure is not so limited.

In some embodiments, the above noted robotic limbs of a robotic system may also include a third limb segment. As previously described, this third limb segment may have a length that is appropriate for accommodating corresponding height changes when a user traverses stairs. Appropriate lengths for the third limb segment of the robotic limbs may be between or equal to 5 inches and 10 inches, 7 inches and 9 inches, and/or any other appropriate length as the disclosure is not limited in this fashion. In one specific embodiment, the third limb segment may have a length of 8 inches. It should be understood that these lengths may be combined with the above noted overall lengths and ratios provided for the first and second limb segments. However, embodiments in which a third limb segment including these dimensions is combined with limb segments with different overall lengths and/or ratios, and/or in which a third limb segment is not operated during movement of a robotic system over stairs, are also contemplated as the disclosure is not so limited.

While the above lengths are provided with units of inches and feet, these dimensions may be converted into metric units using the following conversions. Specifically, feet may be converted into meters using a conversion factor of 0.3048 and inches may be converted into meters using a conversion factor of 0.0254.

While specific limb segment lengths and ratios of these lengths are noted above, it should be noted that the current embodiments are not limited to only these lengths and ratios as the disclosure is not so limited. Instead, the current disclosure should be interpreted broadly as describing the use of robotic limbs with limb segments having appropriate lengths that may be moved relative to one another. Additionally, due to the variability between different user's body proportions, in some embodiments, it may be desirable for at least one, and/or both, of the first and second limb segments of a robotic limb to be adjustable in length. This may be provided using extendable limb segments including detents, an extendable assembly with a clamping assembly, a motor and associated extendable tubular assembly, and/or any other appropriate limb segment arrangement capable of being adjusted in length. Accordingly, a user may adjust a length of the first and/or second limb segments to appropriately support a load when the user is both standing and in a crawling position.

In some designs, the maximum torque exerted during typical operation of the disclosed robotic systems may occur during the transition from a crawling to standing mode of motion. However, peak torques may be significantly reduced by leveraging the redundancy in force application resulting from a closed-loop kinematic chain formed by a particular posture of the robotic legs of a system. Specifically, as elaborated on further below, in some embodiments, a robotic system may include first and second robotic limbs that are configured to be attached to a user's body. When worn, the first and second robotic limbs may be configured such that they extend towards and contact a surface proximate a user, such as a surface the user is located on, to support a load applied to the robotic system relative to the surface. As compared to other configurations, robotic limbs that extend outwards from a user in a direction that is generally parallel to a frontal plane of the user when worn may exhibit enhanced stability and reduced actuation torques based on the robotic limbs and body forming a closed-loop kinematic chain with the ground due to the forces applied by the legs and weight of the system acting substantially in a single plane. Accordingly, in at least one mode of operation, the robotic limbs may be substantially disposed within a plane parallel to a frontal plane of the user when worn during a transition between one or more configurations including, for example, transitioning between a standing and crawling configuration as well as other configurations where a height of the user may change during operation. In addition to being disposed within the noted plane, in some embodiments, the first and second robotic limbs may also be located on opposing sides of a mid-sagittal plane of the user when worn as well such that the robotic limbs may be attached to and extend out from opposing portions of the robotic system.

While configurations of robotic limbs that extend outwards from a user in directions that are generally parallel to a frontal plane of a user when worn are described above, the current disclosure is not limited to only this type of configuration of robotic limbs. For example, robotic limbs that re generally disposed in planes that are parallel to a sagittal plane of a user when worn are also contemplated. Additionally, in some embodiments, a robotic system may include robotic limbs that are configured to be selectively moved between a first configuration where the robotic limbs are disposed in planes that are parallel to a sagittal plane of a user (i.e. sagittal plane oriented legs) when the system is worn and a second configuration where the robotic limbs are disposed in a plane that is parallel to a frontal plane of a user when the system is worn (i.e. frontal plane oriented legs). In certain embodiments, the robotic system may also include multiple robotic limbs that may be positioned either symmetrically and/or non-symmetrically relative to a mid-sagittal plane of a user as the disclosure is not limited to any particular configuration and/or arrangement of the disclosed robotic limbs.

In yet another embodiment, a robotic system may include a base that is configured to be attached to a user's body. The robotic system may include a first robotic limb and a second robotic limb. Similar to the above embodiments, the robotic limbs may be configured such that they extend towards and contact a surface proximate the user, such as a surface the user is located on, to support a load applied to the robotic system relative to the surface. Each of the robotic limbs may include a plurality of actuators and individual limb segments which may operate cooperatively to provide the desired load support and enable the robotic system to traverse the surface with the user. For example, each of the robotic limbs may include a first actuator operatively coupled to the base, a first limb segment that is operatively coupled to the first actuator, a second actuator that is operatively coupled to the first limb segment and a second limb segment that is operatively coupled to the second actuator. Depending on the particular embodiment, the second limb segment may either directly contact the ground and/or a separate structure, such as an articulated ankle, a wheel, a static tip (e.g. a rubber or other high friction component), and/or other appropriate structure, may be operatively connected to the second limb segment for contacting the ground.

In the embodiments described herein a wearable robotic system may be constructed to support a number of different loads and/or combination of loads. For example, in one embodiment, a wearable robotic system may be configured to support at least a portion of a user's weight and/or at least a portion, and in some instances substantially all, of a payload's weight that the user is moving with. Additionally, a wearable robotic system may support at least a portion, and in some instances substantially all, of the robotic system's weight as well. In instances where the wearable robotic system supports at least a portion of the user's weight relative to an underlying surface, the robotic system may either help to support a user in a desired position, aid a user in transitioning between positions (e.g. applying an assistive force to aid a user in transitioning between standing and crawling), and/or simply reduce the amount of weight a user supports while wearing the device. When combined with the ability of the disclosed wearable robotic systems being capable of moving through an environment with a user, the disclosed robotic systems may permit a user's payload to be increased while either completely bearing the weight of the payload and/or at least not increasing the weight of the payload applied to the user as the user moves through and/or interacts with an environment. As noted previously, the load reduction provided by the disclosed robotic systems may reduce worker fatigue, increase the amount of air or other payload a worker is able to carry, aid in stabilizing a worker in various positions, as well as aid in workers transitioning between positions to name a few possible benefits.

As the term is used herein, a "sagittal plane" may refer to an anatomical plane which divides a user's body into right and left parts as those terms are typically applied to the human body. Thus, a sagittal plane may pass from a front of a user's body towards a rear of a user's body. In some instances a sagittal plane may be referred to as a mid-sagittal plane which may refer to a plane that passes through a center of a user's body and splits it into two symmetric halves.

As the term is used herein, a "frontal plane" may refer to an anatomical plane which divides a user's body into ventral and dorsal (i.e. belly and back) sections. Thus, a frontal plane may pass from a left side of the user's body towards a right side of a user's body, such that the plane passes through both shoulders. In some instances, a frontal plane may be referred to as a mid-frontal plane which may refer to a plane that passes through a center of a user's body.

The disclosed robotic systems including two or more robotic limbs may exhibit a variety of different modes of movement. For example, the robotic limbs may be configured and controlled to walk across a flat and/or inclined surface. Additionally, the surfaces may either be smooth and/or have obstacles along their path which the robotic limbs may be appropriately controlled to either avoid and/or step over. Additionally, in some embodiments, the robotic limbs may be configured and controlled to: climb stairs; assume various configurations including a standing configuration, a crouching configuration, a crawling configuration; transition between different configurations, such as transitioning between a standing configuration and a crawling configuration; and/or move while in these various configurations. Accordingly, it should be understood that the currently disclosed robotic systems are capable of being used in a number of different configurations for accommodating different user positions as well as moving the robotic limbs to provide different forms of movement including walking, crawling, and other appropriate forms of movement.

To enable a robotic system to traverse a surface, the various robotic limbs described herein may be configured to move in a variety of directions depending on their particular construction. For example, in one embodiment, the robotic limbs may be configured such that a portion of the robotic limbs constructed to contact the ground during operation may move in a direction that includes a directional component that is parallel to a sagittal plane of a user and the underlying ground when the robotic system is worn. For example, this movement may include movement that is oriented both in a vertical and transverse direction relative to an underlying surface such that the robotic limbs may move between front and rear positions to "walk" the robotic system across the underlying surface. This may include robotic limb arrangements that extend within a plane that is parallel to a sagittal plane of the user as well as robotic limb arrangements that extend at least partially within a plane that is parallel to a frontal plane of the user even though the specific motions for these different arrangements may vary.

It should be understood that the robotic limbs of a robotic system may be attached to a user in a number of different ways as the disclosure is not limited in this fashion. For example, in some embodiments, the various robotic limbs described herein may be operatively coupled to a base that may be configured to be attached to a user's body. The base may take a number of different form factors, including, but not limited to, a structural plate attachable to a harness or system worn by the user, attachment points or other structures integrated into a harness or other system capable of being worn by the user, anchor points on a rigid structure constructed to be worn on a user's body, and/or any other appropriate structure capable of supporting the robotic limbs of a system relative to a user's body. It should be understood that the robotic limbs and associated base may be attached to a user's body in any appropriate fashion, including, for example, the structures may be incorporated into and/or attached to a harness, a vest, an exoskeleton, and/or any other structure capable of attaching a wearable robotic system to a user's body. Additionally, the structure, or structures, used to attach a robotic system to a user's body may be attached to any appropriate portion of a user's body including, but not limited to, a torso, shoulders, arms, legs, combinations of the forgoing, and/or any other appropriate portion of a user's body.

The robotic limbs described in the various embodiments herein may be made from any appropriate material. For example, appropriate materials may include, but are not limited to, carbon fiber tubing, other composite material systems, steel tubing, aluminum tubing, and/or any other appropriate type of material. Additionally, the individual limb segments of the robotic limbs may have any appropriate cross-sectional and/or longitudinal shape as the disclosure is not limited in this fashion. For example, tubes and/or shafts with circular, polygon, and/or any other appropriate cross-sectional shape may be used. Additionally, while linear tube or shaft geometries have been shown, three dimensional structures including trestle structures and/or any other appropriate type of limb segment may also be used. It should also be understood that while the depicted embodiments are primarily discussed herein, limb segments which are curved and/or have other nonlinear shapes are also contemplated as the disclosure is not so limited.

The actuators described herein may correspond to any appropriate type of actuator for providing the desired movement of a particular joint. For example, in some embodiments, the disclosed actuators may correspond to motors that directly drive an associated joint and/or an actuator may include a motor and an associated differential transmission and/or other appropriate type of transmission to transform motion output by the motor into one or more desired forms of motion. In embodiments in which a differential transmission is used, an actuator may also include two motors whose outputs are coupled to the two differential inputs. In such an embodiment, depending on how the motors are controlled, the differential may output motion in two directions either in separate actuation steps and/or during a combined movement (e.g. rotation of a joint about two separate axes either during separate actuation steps or at the same time). In view of the above, the actuators described herein may be configured to rotate a limb segment attached to an output of the actuator about an axis that is substantially parallel to a longitudinal axis of the limb segment, which may correspond to a general direction in which the limb segment extends. An actuator may also be configured to rotate a limb segment attached to an output of the actuator about an axis that is substantially perpendicular to the longitudinal axis of the limb segment. Embodiments in which an actuator provides either one or both of these types of motions to a limb segment attached to an output of the actuator are contemplated.

Specific types of actuators that may be used may include, but are not limited to, near-direct drive actuators, series elastic actuators, and/or actuators, including transmissions with large gear ratios and an associated force sensor. Without wishing to be bound by theory, near-direct drive actuators may offer a higher bandwidth capability for responding to applied forces and movements, while also being relatively simple and permitting the robotic system to be back driven. However, near-direct drive actuators may need high fidelity sinusoidal commutation of the motor. Further, due to the actuators being back drivable, the robotic system may collapse during a power failure. High torque density motors which may be appropriate for such an application also tend to be more expensive and heavy. Regarding series elastic actuators, these types of actuators may provide passive impedance to a robotic system, meaning that the robotic system may restore itself to a neutral position even during a power or other type of system failure. However, series elastic actuators tend exhibit a more limited bandwidth and may complicate control of a system as compared to other types of actuators. With regards to an actuator including a transmission with a large gear ratio, such an actuator may be lighter and more compact in design as compared to the above noted actuators due to the ability to use a smaller motor with a higher gear ratio to achieve similar performance. Additionally, due to the larger gear ratio, the actuator may not be back drivable which may result in the robotic system remaining stationary in the case of a power failure. However, the force sensors which may be used to control such an actuator are expensive and such a system may also exhibit more limited bandwidth for control purposes. Additionally, due to the actuator not being back drivable, such an actuator may be more susceptible to shock loading.

In view of the above, the types of actuators used in a particular robotic system may be chosen based on the desired performance characteristics of the robotic system. For example, all of the joints in a particular robotic system may be powered through the use of a single type of actuator and/or a combination of the actuators described herein may be used. Additionally, instances in which actuators other than those noted above are used in a robotic system are also contemplated as the disclosure is not limited to any particular type of actuator. Further, in cases where it is desirable for an actuator to be back drivable, a gear ratio of a transmission linking a motor to an output of an actuator may be between or equal to 1 and 10, 2 and 8, 3 and 5, and/or any other appropriate gear ratio for a given friction of an associated motor and transmission to provide a desired amount of back drivability of an actuator. Of course, given that large gear ratio non-back drivable actuators are discussed above, embodiments in which transmissions with gear ratios both larger and less than those noted above are included in a robotic system are also contemplated as the disclosure is not so limited.

To help enable control of a robotic system, one or more sensors may be connected to a controller of the one or more robotic limbs of a robotic system. Specifically, these one or more sensors may include sensors to detect the position, forces, and/or torques applied to the robotic limbs. For example, position encoders, torque sensors, force sensors, and/or any other appropriate type of sensor may be incorporated into and/or positioned in line with the actuators and/or limb segments of the robotic limbs. These sensors may be configured to detect the forces, torques, angular accelerations, angular velocities, and/or any other appropriate operating parameter of the robotic limbs. The noted sensors may also include one or more sensors that are configured to detect relative movement, force, and/or torques between the robotic system and a user the system is attached to. Sensors capable of sensing these operating parameters between a robotic system and a user may include extensometers, linear voltage displacement transducers, strain gauges, rotational position encoders, force sensors, torque sensors, and/or any other appropriate sensor capable of detecting a relative displacement, orientation, force, and/or torque between a portion of a robotic system and the user. In instances where sensors are used to detect the relative displacement and/or orientation of the robotic system and the user, the sensors may detect movement in 3, 4, 5, 6, and/or any other appropriate number of degrees of freedom which may include translational and/or rotational motion between the user and the associated portion of the robotic system along any appropriate number of axes. Accordingly, the sensors may enable an associated controller to determine a relative trajectory of a person's center of mass and a center of mass of the robot and/or combined system of the robotic system and user. This relative trajectory may be used for controlling operation of the robotic limbs of the system to either change a configuration of the robotic system and/or operate the robotic system to move across a surface in sync with movement of the user across the surface.

The robotic limbs of a robotic system may be controlled in a number of different ways to enable a system to walk through an environment while maintaining a desired position and/or orientation relative to a user wearing the robotic system. For example, in one embodiment, the above-noted sensor inputs may be provided to a controller connected to the actuators of the robotic limbs. The controller may control a current, which may be related to torque, of the motors of the various robotic limb joints by applying a voltage and any appropriate current feedback control method including, for example, proportional integral derivative control (PID), lead-lag, sliding mode, and/or any other appropriate control method. The controller may control the position, velocity, stiffness, and damping of each motor based at least partly on encoder feedback. In some instances, some of these operating parameters may be used in a feed forward manner to enable a desired control of the system. The controller may also command the endpoint position and forces/torques to be applied by each robotic limb using forward/inverse kinematics and the Jacobian of the system. The controller may then determine the differential mechanism of the system by abstracting it out of this calculation. Finally, the controller may determine a desired pose, which may correspond to a combined position and orientation of the robotic system relative to a user, as well as the pose derivative of the torso which may then be controlled accordingly. Using these control parameters and calculations, the controller may appropriately command the robotic limbs to enable the robotic system to walk through an environment while maintaining a desired position and orientation relative to the user. For example, a controller may implement Zero Moment Point (ZMP) walking of the robotic limbs which may be viewed as a quasistatic walking mode which may be appropriate for carrying heavy loads. Of course embodiments in which a controller implements more complex dynamic walking models are also contemplated. Additionally, while a particular generic control structure is detailed above, it should be understood that the current disclosure is not limited to any particular type of control method for the robotic systems disclosed herein.

A robotic system may be designed to support any appropriate load for a desired application including, for example, loads such as SCBA tanks, personal cooling systems, tools, backpacks, and/or any other load that may be desirable for carrying with a user. In some embodiments, a robotic system may be designed to support a payload while a user is in a standing position, walking, crouching, crawling, traversing stairs, and other appropriate forms of movement and/or posture. The weight of the payload that may be supported by the robotic system may be between or equal to 20 pounds and 100 pounds, 30 pounds and 80 pounds, 40 pounds and 60 pounds, and/or any other appropriate weight both greater than and less than the weights noted above. Additionally, in some embodiments, it may be desirable for a robotic system to bear at least a portion of a user's weight in addition to the associated payload. In one such embodiment, a robotic system may provide an assistive lifting force to the operator's torso when transitioning between a standing and crouching position, transitioning between a standing and crawling position, when the user is in a crawling position on the ground, and/or during any other appropriate form of movement and/or user position. Appropriate amounts of assistive lifting force that a robotic system may apply to a user when the user is performing these types of movements and/or is in the noted positions may include forces between or equal to 20 pounds and 100 pounds, 30 pounds and 80 pounds, 40 pounds and 60 pounds, and/or any other appropriate force both greater than and less than the forces noted above.

Depending on the desired application, a robotic system may be designed to operate for any desirable amount of time. However, in some embodiments, a robotic system may appropriately balance the onboard energy storage versus expenditure, e.g. battery storage versus power requirements, to provide a desired operational time for a system. For example, a robotic system may be designed to operate for a time period that is greater than or equal to 0.5 hours, 1 hour, 2 hours, and/or any other appropriate time period. Additionally, the robotic system may be designed to operate for a time period that is less than or equal to 5 hours, 3 hours, 2 hours, and/or any other appropriate time period. Combinations of the foregoing ranges are contemplated, including, operational time periods that are between or equal to 0.5 hours and 5 hours. However, operational time periods both greater than and less than those noted above are also contemplated as the disclosure is not limited in this fashion.

For the sake of clarity, the embodiments described in regards to the figures are primarily directed to robotic systems that support a user in crawling and standing postures. However, it should be understood that embodiments in which a robotic system may be constructed to support a user in additional and/or different postures relative to an associated surface are also contemplated as the disclosure is not so limited.

For the sake of clarity, the various embodiments described herein are primarily directed to robotic systems where the robotic limbs include either two or three limb segments that may be moved relative to each other. However, it should be understood that the various embodiments described herein are not limited to use with robotic limbs having only two or three limb segments. Instead, the disclosed embodiments may include robotic limbs with any appropriate number of individual limb segments. For example, additional limb segments may allow some degree of redundancy in the robotic limbs. In one example, a robotic limb including additional limb segments may be operated such that an endpoint of the robotic limb may remain in contact with a surface and a corresponding shoulder joint may remain stationary while one or more other limb segments of the robotic limb are actuated to move out of the way of an obstruction. Accordingly, it should be understood that the disclosed robotic systems may include any appropriate number of robotic limbs, and each of those robotic limbs may include any appropriate number of robotic limb segments as the disclosure is not limited in this fashion.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts a user 100 wearing a robotic system 200 that includes first and second robotic limbs 202 that are configured to extend towards and make contact with a surface, such as the ground, proximate to the user and robotic system. As illustrated in the figure, the robotic system may assume different configurations, while either remaining static and/or moving across the surface in sync with the user. For example, the robotic system is depicted as transitioning between a static standing configuration, a standing walking configuration, a crouching configuration, and a crawling configuration. Of course different configurations associated with different postures by a user as well as different modes of movement other than those depicted in the figure are also contemplated as the disclosure is not so limited.

Figure 2:
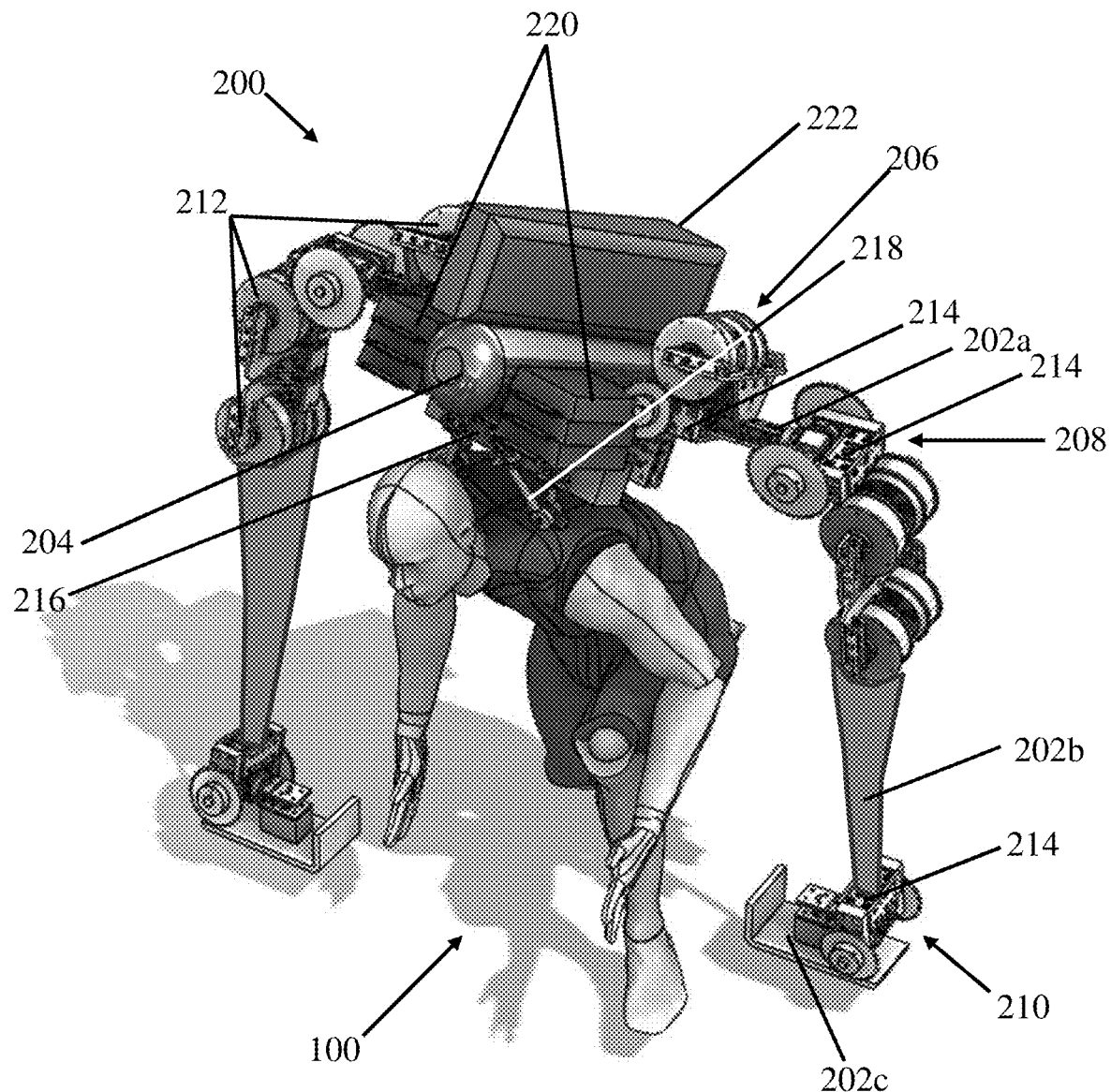
FIG. 2 is a schematic representation of a wearable robotic system.

FIG. 2 depicts one embodiment of a robotic system 200 worn by a user 100. As illustrated in the figure, the robotic system may include a plurality of robotic limbs which may include at least first and second robotic limbs 202 located on opposing sides of a mid-sagittal plane of the user. The robotic limbs extend outwards and vertically down relative to a surface the user is located on such that the distal ends of the robotic limbs contact the surface during operation when worn by the user. The robotic system may include a base 204 that is constructed and arranged to be attached to a user's torso. The base, or an associated structure attached to the base, may be configured to couple a payload 222 to the robotic system such that the robotic system may bear at least a portion, and in some embodiments, the entire, weight of the payload during operation. The robotic limbs may also be operatively coupled to the base such that the robotic limbs are indirectly attached to the user's torso. For example, the robotic limbs may include a shoulder joint 206 that movably couples a first limb segment 202a to the base. A knee joint 208 may movably couple a second limb segment 202b to the first limb segment. Additionally, in some embodiments, an ankle joint 210 may movably couple a foot 202c to the second limb segment. However, embodiments in which the robotic limbs do not include an actuated ankle joint are also contemplated. For example, as noted previously, a distal end of the robotic limbs, as viewed relative to a portion of the robotic limbs attached to the base, may simply include a point contact with the ground, a wheel, and/or any other appropriate structure and/or component capable of making contact with the ground during operation of the robotic system.

As also shown in FIG. 2, the robotic system 200 may include a plurality of actuators such that at least one actuator is associated with each joint including, for example, the shoulder joint 206, knee joint 208, and ankle joint 210 of the robotic limbs 202. In the depicted embodiment, the actuators may include one or more motors 212 that are either directly or indirectly coupled to the associated limb segments to provide the desired motion for the various joints. In one such embodiment, the motors may be operatively coupled to an appropriate transmission, including, for example, a differential transmission 214 as depicted in the figures. Specifically, in the depicted embodiment, a pair of motors 212 include outputs that are operatively coupled to the two inputs of the associated differential transmission such that the output of the differential transmission may apply a desired motion to a limb segment coupled to an output of the differential transmission. In one such embodiment, a shoulder joint 206 may include a differential that is coupled to a base 204 of the robotic system such that two associated motors may control an output of the differential transmission that is coupled to a first limb segment 202a of a robotic limb. Correspondingly, a knee joint 208 of the robotic limb may include a differential that is coupled to the first limb segment 202a and two operatively coupled motors may be used to drive an output of the differential transmission that is coupled to the second limb segment 202b. Similarly, the ankle joint 210 may include a differential transmission that is coupled to the second limb segment and two motors may be operatively coupled to the inputs of the differential transmission to drive an output of the differential transmission that is coupled to the foot 202c of the robotic limb.

In view of the above described joints and associated actuators, a robotic system 200 may include robotic limbs with shoulder 206, knee 208, and ankle 210 joints the may move in the following manner. Specifically, the shoulder joint may rotate the operatively coupled first limb segment 202a of a robotic limb relative to the base 204 about an axis that is substantially parallel to a longitudinal axis of the first limb segment which may correspond to a direction in which the robotic limb segment generally extends. The shoulder joint may also rotate the first limb segment relative to the base about an axis that is substantially perpendicular to a longitudinal axis of the first limb segment. Similarly, the knee joint may rotate the second limb segment 202b relative to the first limb segment about an axis that is substantially parallel to a longitudinal axis of the second limb segment and/or an axis that is substantially perpendicular to the longitudinal axis of the second limb segment. The ankle joint may also rotate the foot 202c relative to the second limb segment about an axis that is substantially parallel to a longitudinal axis of the foot and/or an axis that is substantially perpendicular to the longitudinal axis of the foot. Of course, while particular types of movement and combinations of movements are described above relative to the various articulated joints of a robotic limb, it should be understood that embodiments in which different types of motions, combinations of motions, and/or different types of actuators and/or joints are used in a robotic system are also contemplated as the disclosure is not limited in this fashion.

To facilitate the operation and control of a robotic system, the robotic system may include one or more controllers 220 which may be operatively coupled to the associated motors 212 of the various actuated joints of the robotic system. The robotic system may also include one or more batteries 216, which may be used to power the motors. However, embodiments in which a power tether, and/or other appropriate type of power source is used to power the robotic system are also contemplated as the disclosure is not limited to any particular method of powering operation of the system. The robotic system may also include one or more sensors that are configured to detect the relative movement and or forces present between the robotic system and a user 100 and/or one or more operating parameters of the actuated joints of the associated robotic limbs 202. For example, the one or more sensors may include a force and/or torque sensing harness 218 that is disposed between a base 204 of the robotic system and the user. However, different arrangements and form factors of sensors for detecting the relative forces, torques, and/or movements present between a user and the robotic system are also contemplated.

Having described the general described the components of the robotic system 200 shown in FIG. 2, the general operation of the various joints illustrated for the robotic limbs 202 are described in further detail. Specifically, the robotic limbs may be controlled in a variety of different operating modes to assume different configurations to accommodate postures of a user 100, which may include standing, crouching, crawling, and/or any other appropriate postures the user may assume. The robotic system may also be held static while in these postures, and/or may be operated to walk along a surface on which the user and robotic system are located in sync with detected motion of the user relative to the robotic system. For example, a shoulder joint 206 and knee joint 208 of a robotic limb may be operated cooperatively to provide a desired angular orientation and height of an associated base 204 of the robotic system which may be attached to the user's torso. These joints may also be operated cooperatively to move a distal end, such as the foot 202c of the robotic limb, in a direction that is at least partially oriented parallel to a sagittal plane of the user and the underlying surface such that the robotic limbs may walk across the surface. Again, this walking motion may be provided while the robotic system is in a standing configuration, a crouching configuration, and/or a crawling configuration as the robotic systems are not limited to only moving in these select configurations.

One of the challenges in designing a robotic system capable of supporting a payload while moving with an associated user is providing sufficient loadbearing capacity. For example, for merely increasing actuator torque, the use of high gear-ratio actuators may suffice. However, for stable walking and crawling, it may be desirable for the robotic limbs of a system to be able to move relatively quickly. Furthermore, to better control the dynamic interactions with the ground, backdrivable actuators with high torque and low gear reduction may also be desirable, but such actuators may be more limited in their load bearing capacity. To overcome these conflicting design parameters, it may be desirable for a robotic system to utilize kinematic singularity, or near singular, behavior during operation of the robotic limbs where a mechanical advantage of the system may increase significantly when the robotic system is in a desired configuration. This may decrease the corresponding force and/or torque requirements of the system during operation to maintain the desired configuration. Additionally, in some embodiments, a robotic system may exploit a closed-loop kinematic chain formed by the ground and legs of the robotic system where the internal forces and torques of the robotic system may be arbitrarily controlled so that the overall torque requirements of the various joints of the robotic limbs of a system may be lowered for individual actuators. Specific embodiments related to these concepts are described further below.

Figure 3:
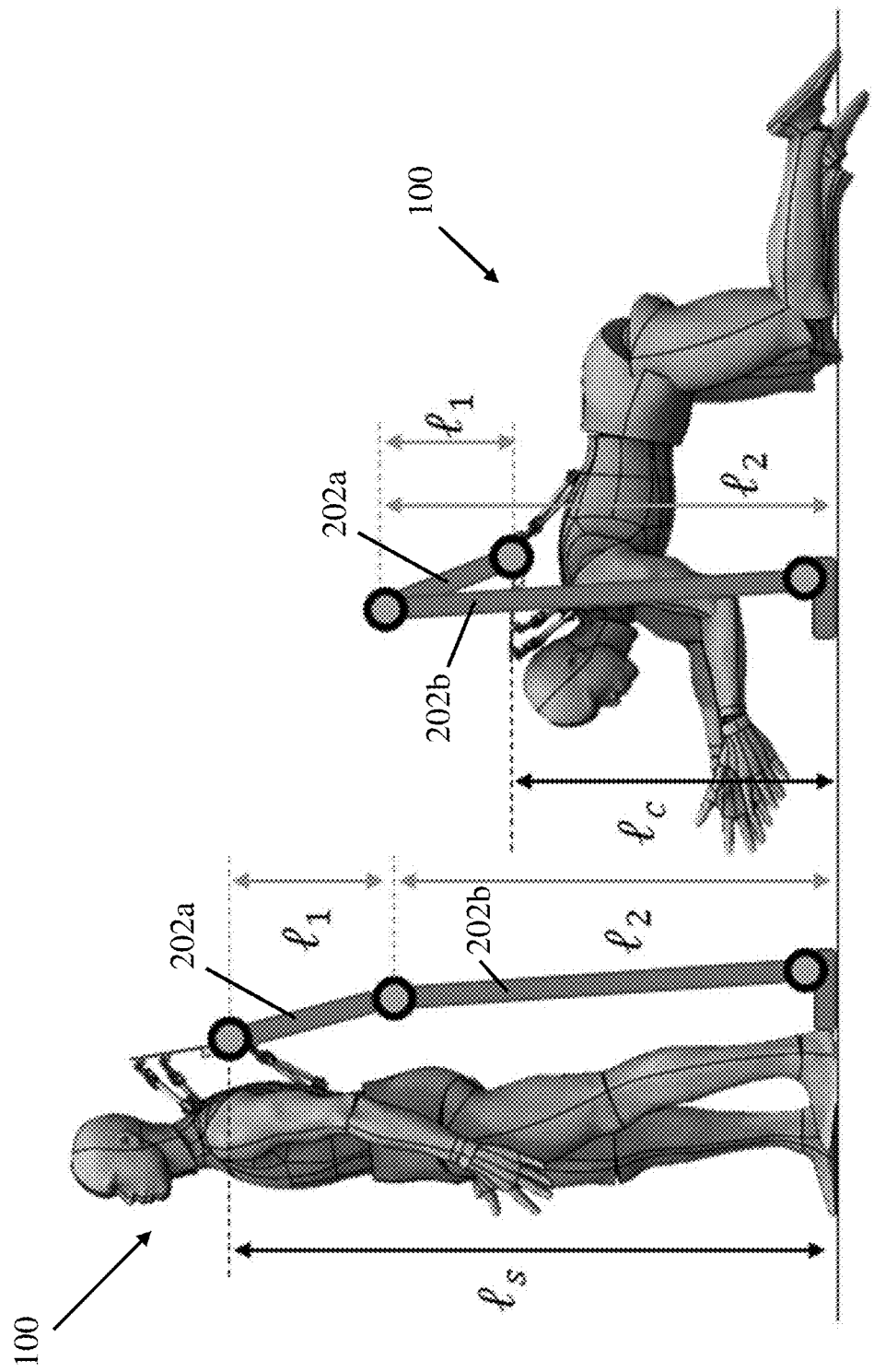
FIG. 3 is a schematic of a wearable robotic system including a robotic limb with two robotic limb segments that are movable relative to each other to place the user in an energetically favorable standing or crawling position.

FIG. 3 illustrates the design and operation of a robotic limb including a first limb segment 202a attached to the torso of a user 100 and a second limb segment 202b that extends from the first robotic limb segment to a surface on which the robotic system and user are located. In the depicted embodiment, the linkage geometry of the robotic system is designed to facilitate energy efficient operation during the most common usage situations, namely while upright (standing or walking) and while crawling. If the legs are positioned such that the motors do not need to apply any substantial torque to bear the assistive and payload forces, then the structure itself may bear most, if not all, of those forces. For example, in the depicted configurations the first and second limb segments may be substantially aligned and extended while in the standing configuration such that a majority of the loads may be transmitted axially through these connected limb segments. In contrast, when in the crawling configuration, the first limb segment may be rotated downwards towards the surface relative to the second limb segment it is connected to. Again, when hanging in this configuration, the mechanical advantage present in the system may be increased such that a reduced torque may be applied to maintain the robotic system and user in the depicted configuration. Additionally, a majority of the force applied to the robotic limb may again be transmitted through the robotic limb structure without the need to directly actuate the associated robotic limb joint. Accordingly, in some embodiments, the linkage geometry of the robotic limbs of a system may be selected to provide near kinematic singularity actuation for one or more postures of a user which may lead to longer more efficient operation of the robotic system.

In view of the above, it may be desirable to design the relative lengths of the first and second limb segments of a robotic limb to appropriately support a user in a standing configuration when the robotic limbs are in an extended configuration and in a crawling configuration when the robotic limbs are in a retracted configuration. For example, as also shown in FIG. 3, the relative motion of the limb segments may position an end of the robotic limbs 202 attached to a user 100 at different vertical heights denoted by $l_s$ while standing and $l_c$ when crawling. The lengths of the first 202a and second limb segments 202b are denoted by $l_1$ and $l_2$, respectively. The limb segment lengths may be chosen to meet the following conditions:

$$l_s = l_1 + l_2$$

$$l_c = l_2 - l_1$$

Note that the specific link lengths may be parametrized by the operator's own shoulder height ls and crawling height lc. By specifying an ls and lc, measured empirically from the operator's own dimensions, the simultaneous equations may be solved to find an $l_1$ and $l_2$ that will satisfy the conditions. Appropriate length combinations and ratios of these limb segment lengths which may be used to provide robotic limbs appropriate for supporting a user while standing and/or crawling while using minimal forces and/or torques have been provided previously above.

Figure 4A:
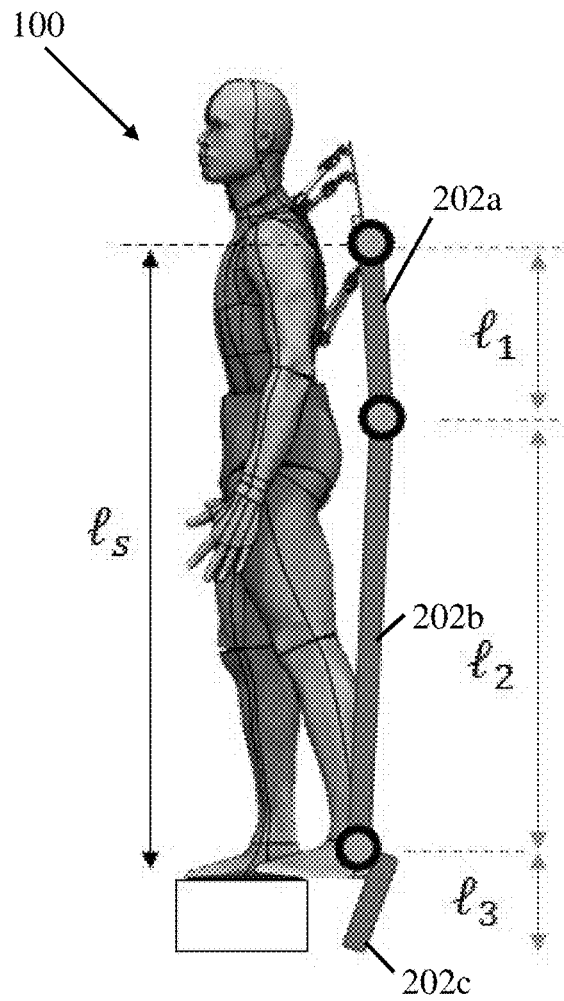
FIG. 4A is a schematic of a wearable robotic system including a robotic limb with three robotic limb segments that are movable relative to each other to aid a user in traversing stairs.

FIG. 4A depicts an embodiment similar to that shown in FIG. 3. The depicted robotic system may again be attached to a user 100 and the individual robotic limbs may include a first limb segment 202a and a second limb segment 202b that may be operated as described above to support a user in two or more postures. In addition, the robotic limb may also include a third limb segment 202c that is attached to and extends from the second robotic limb segment. This third limb segment may be configured as a foot of the robotic system that contacts a surface proximate to the user and robotic system while moving in sync with a user traversing stairs. While traversing the stairs, the first and second limb segments may be held in a first configuration with a first desired length which, in the depicted embodiment, may correspond to a height $l_s$ that is approximately equal to a shoulder height of the user as previously described. Of course embodiments in which the extended length of the first and second segments is greater than or less than shoulder height of a user are also contemplated. Additionally, embodiments in which the first and second limb segments are replaced with a single unitary limb segment are also contemplated. In either case, the third limb segment may be moved between a first retracted position and a second extended position to change an overall length of the robotic limb to accommodate the corresponding height of the individual stairs. For example, as shown in the figures, the foot may be put into a tip toe like configuration where a distal end of the foot is oriented to contact the ground while the axial portion of the foot is not in contact with the ground. Accordingly, in at least one configuration (e.g. an extended configuration of the various limb segments), the overall length of a robotic limb resulting from the combined length of the first, second, and third limb segments may correspond to a maximum possible robotic limb length which may be approximately equal to a shoulder height of the user plus a height of the corresponding stair. Of course, when the robotic limbs are actuated to walk up the stairs the various limb segments may be positioned in configurations other than the maximum extended positions. However, in some instances, it may be desirable to maintain the third limb segment, which again may be a foot of the robotic limb, in an extended position while traversing the stairs in at least one mode of operation.

Figure 4B:
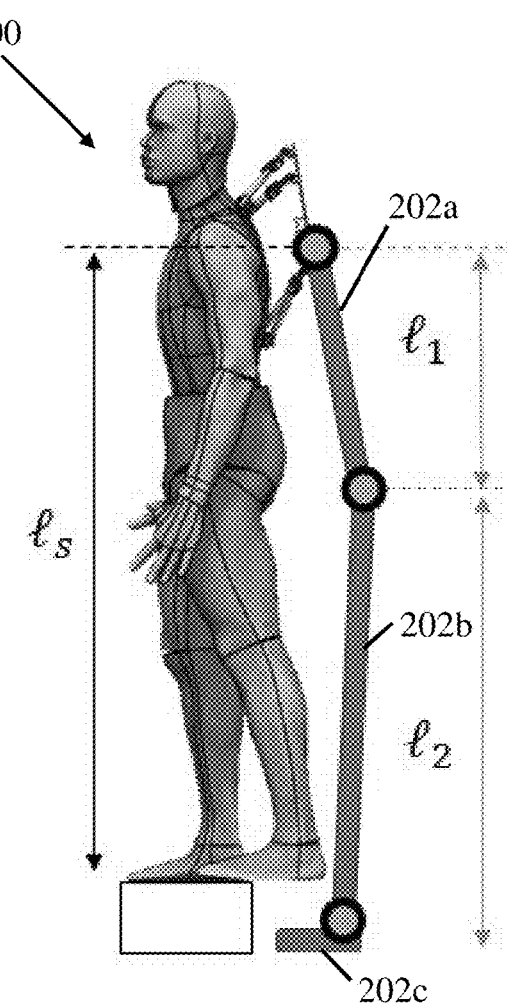
FIG. 4B is a schematic of a wearable robotic system including a robotic limb with three robotic limb segments that are movable relative to each other to aid a user in traversing stairs.

While an embodiment regarding the actuation of a foot of a robotic limb to adjust a length of a robotic limb for use when traversing stairs is described above, embodiments in which robotic limbs may be operated and/or designed in different manners to accommodate movement of the robotic system on stairs are also contemplated. For example, as shown in FIG. 4B a length of the first and/or second limb segments 202a and 202b may be appropriately selected such that a combined length of the first and second limb segments in at least one configuration may be sufficient to accommodate both a height of the user (e.g. approximately a shoulder height of the user) and a height of the corresponding stairs. In such an embodiment, the third limb segment 202c may be maintained in a configuration that is substantially horizontal to an underlying surface of the stairs. Alternatively, the length of the first and/or second limb segments may be adjustable to accommodate the additional expected height of the stairs. In view of these alternative embodiments, it should be understood that the current disclosure is not limited to any specific configuration of the robotic limbs and/or methods of operation of a robotic system when traversing stairs.

One extreme case of force exertion that may occur during operation of a robotic system is when a user is transitioning between the crawling and standing configurations. While each posture requires little to no actuation to maintain, due to the proximity to kinematic singularities in which gravitational loads are borne only by the robot's structure, the robot must pass through a kinematically unfavorable position to transition from one configuration to the other. For example, one or more of the limb segments of a robotic limb may pass through a fully extended orientation during this transition where the corresponding mechanical advantage may be reduced. In one such embodiment, during the transition between the crawling and standing postures, a robotic system may go through a transitory squat posture. Note that the robotic limbs of the robotic system may take diverse configurations in order to make this transition. In particular, two possible configurations for robotic limbs are shown in FIGS. 5 and 6. In both cases, the robotic limbs 202 are arranged such that the legs are located on opposing sides of a mid-sagittal plane 300 of an associated user. However, in the embodiment of FIG. 5, the robotic limbs are configured to be disposed within and move in a plane that is parallel to the depicted sagittal plane. In contrast, FIG. 6 depicts robotic limbs that are located within a plane 302 that is parallel to a frontal plane of a user when the robotic system is worn. While such a posture may not be natural, in some instances, such a configuration may exhibit an advantage of beneficially reducing the actuator torques applied to maintain the desired posture of the robotic system. Specifically, note that the two robotic limbs, the ground, and the robot body form a closed-loop kinematic chain in the case of the frontal plane squat. The internal force and moment generated along the kinematic chain do not influence the static balance of the system. However, such a configuration may change the load distribution among the actuators of the various joints. This may beneficially reduce the applied torque for some joints and redistribute it to other joints, so that the overall torque requirement of the robotic system may be lowered. These two usage scenarios are analyzed and compared further below.

It should be noted that the robotic limbs of a robotic system may either be permanently located in the approximate configurations shown in FIGS. 5-6 and/or the robotic limbs may be configured such that they may be selectively positioned and moved between the sagittal and frontal orientations depicted in the figures. Additionally, it should be understood that while moving the various limb segments to enable walking of the robotic system, portions of the robotic limbs may no longer be completely in alignment with or disposed in the planes in which they are depicted in the figures. However, the robotic limbs may still be understood to be generally disposed within and/or extend in a direction that is parallel to the corresponding sagittal and or frontal planes described above.

Figure 7:
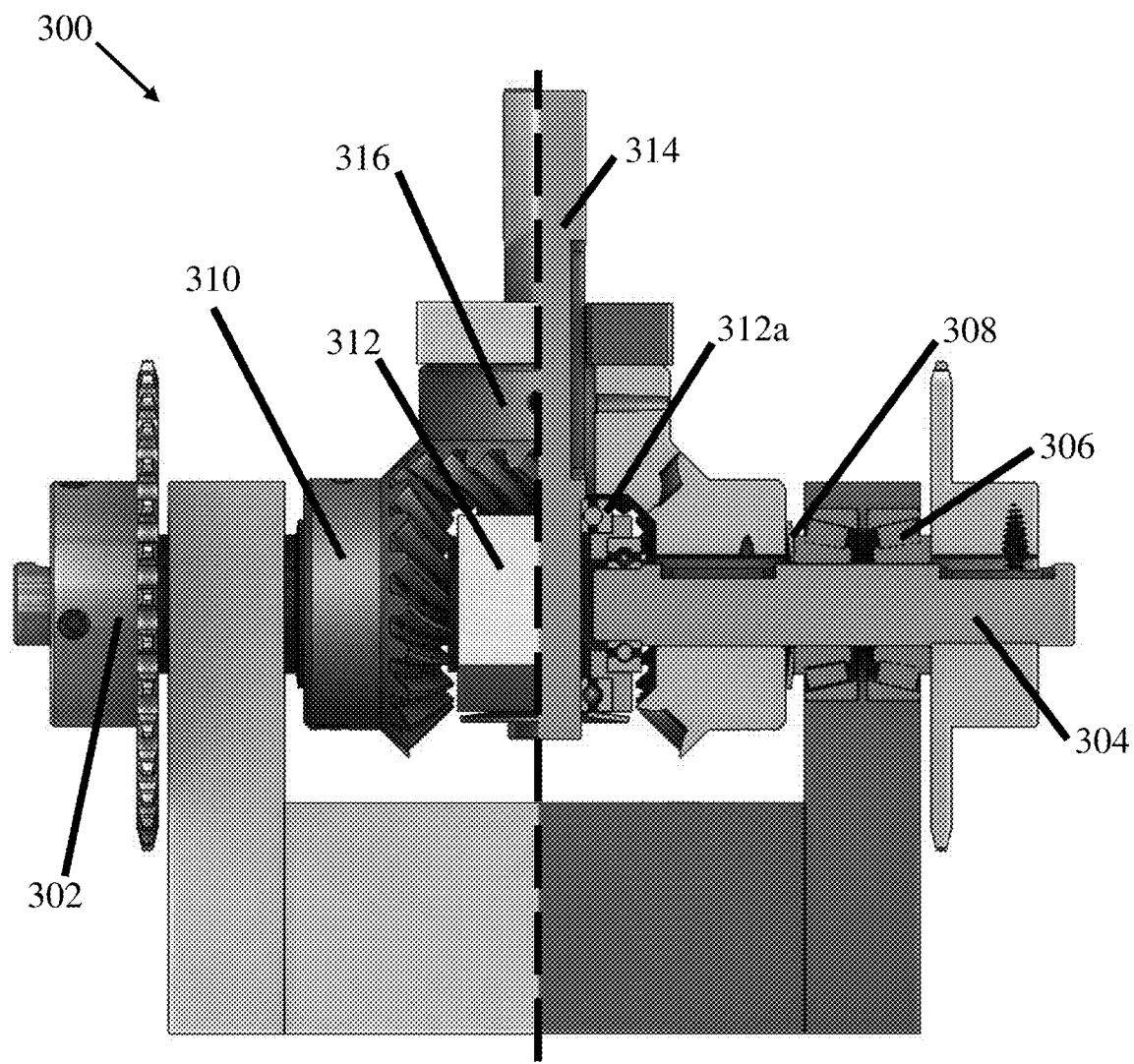
FIG. 7 is a schematic representation of a differential transmission used to provide desired motions of an actuator.

FIG. 7 depicts one possible embodiment of a differential transmission 300. In the depicted embodiment, the differential includes two sprockets 302 that are rotatably fixed to corresponding input shafts 304 that are supported by bearings 306. A preloaded spring washer 308 may be disposed on the shaft to appropriately position a gear 310 rotatably fixed to an end portion of the input shafts opposite the associated input sprockets. The differential transmission may also include an inner block bearing 312, which may include bearings 312a that may rotatably support an opposing end of the input shafts. The differential transmission may also include an output shaft 314 and associated gear 316 that is engaged with the corresponding gears of the two input shafts. During operation, the input shafts may be rotated by either different amounts and/or in opposite directions to rotate the output shaft about its longitudinal axis. Alternatively, the input shafts may be rotated in the same direction to rotate the output shaft of the differential about a longitudinal axis of the input shafts which may also correspond to rotating the output shaft about an axis that is perpendicular to a longitudinal axis of the output shaft. These two types of movement may be generated either separately and/or in combination with one of the other depending on the direction and amount of rotation of the two corresponding input shafts of the differential. Of course, while a particular type of transmission system has been described herein, it should be understood that any appropriate type of transmission, including direct couplings, capable of transmitting movement from an associated actuator to one or more joints of a robotic limb may be used in the disclosed robotic systems as the disclosure is not limited in this fashion.

Figure 8:
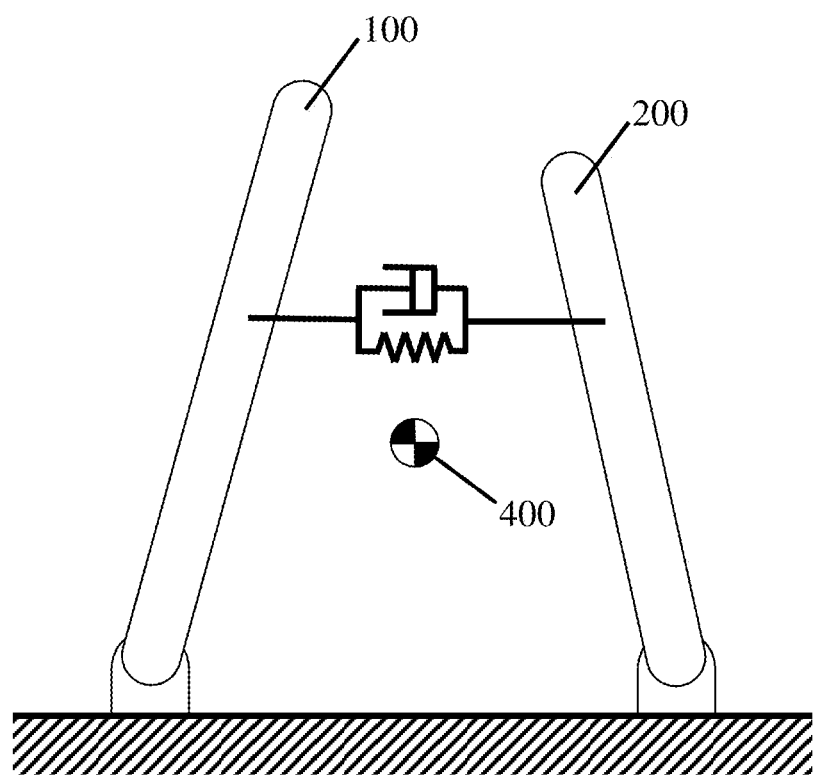
FIG. 8 is a schematic representation of the relative lean of a user and wearable robotic system to maintain a center of gravity within a desired region of stability.
Figure 9:
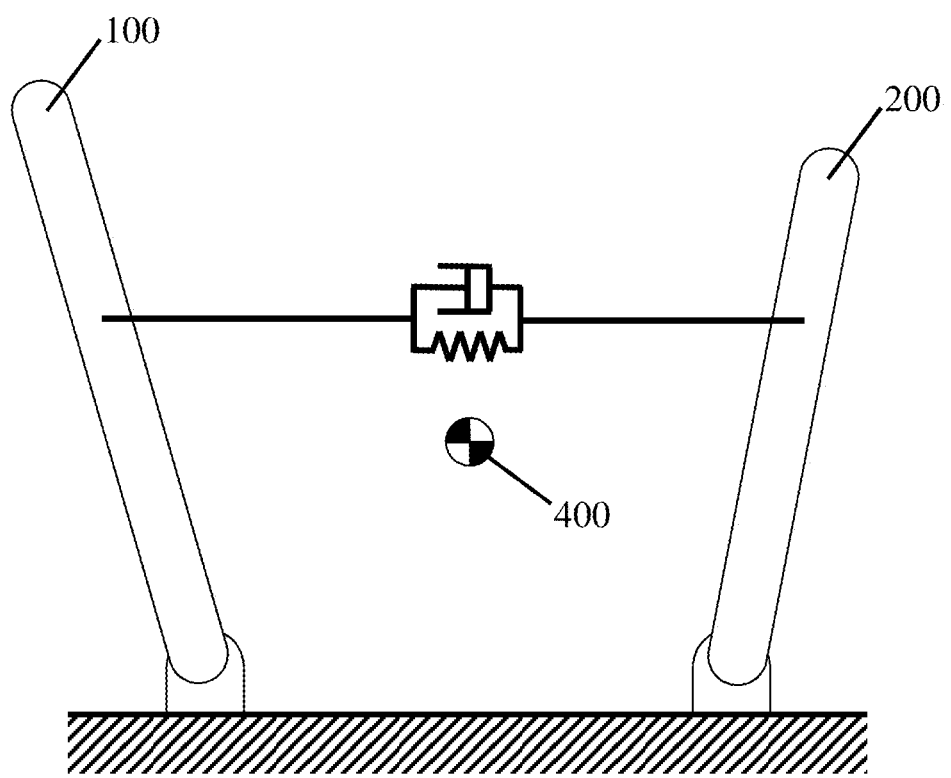
FIG. 9 is a schematic representation of the relative lean of a user and wearable robotic system to maintain a center of gravity within a desired region of stability.

To help facilitate maintaining stability of the combined system of a user and a robotic system worn by the user, it may be desirable in some embodiments to coordinate the directions of lean of a user and a robotic system relative to each other to maintain a center of gravity of the total system within a desired stability region. For example, in one mode of operation, the user 100 and robotic system 200 may lean against each other, i.e. in directions oriented towards each other, as illustrated in FIG. 8. Alternatively, as shown in FIG. 9, the user and robotic system may lean away from each other such that they are angled outwards away from each other during another mode of operation. In either case, the combined center of mass 400 of the user and robotic system may be disposed within a base of a support polygon formed by the combined user and robotic system. This may help to ensure the stability of the user and robotic system. Additionally, depending on the particular embodiment, a robotic system may transition between these two modes of operation. For example, in one instance, a user may be standing and apply a backwards directed force towards the robotic system. In such an instance, the robotic system may apply a corresponding force towards the user such that it leans inwards towards the user. Correspondingly, when the user moves away from the robotic system, such as may occur when the user begins to walk and/or crawl in a desired direction, the robotic system may lean away from the user. A controller of the robotic legs may determine the occurrence of these types of situations and control the robotic limbs accordingly by determining whether the direction of overall forces and/or relatively displacements of the user and robotic system are directed towards and/or away from the robotic system. The controller may lean the robotic limbs in the desired direction to counteract the applied force within some threshold force limit. Of course embodiments in which the user and the robotic system are both angled in the same direction, e.g. both leaning in a forward direction relative to the user, are also contemplated as the disclosure is not so limited. Additionally, while the coupling between the user and robotic system has been illustrated as a spring dashpot system due to the complaint nature of the coupling between a user and robotic system, embodiments in which a more rigid type of coupling may be used to connect a robotic system to a user are also possible.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing device. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Example: Sagittal Plane Vs Frontal Plane Squat

Figure 10:
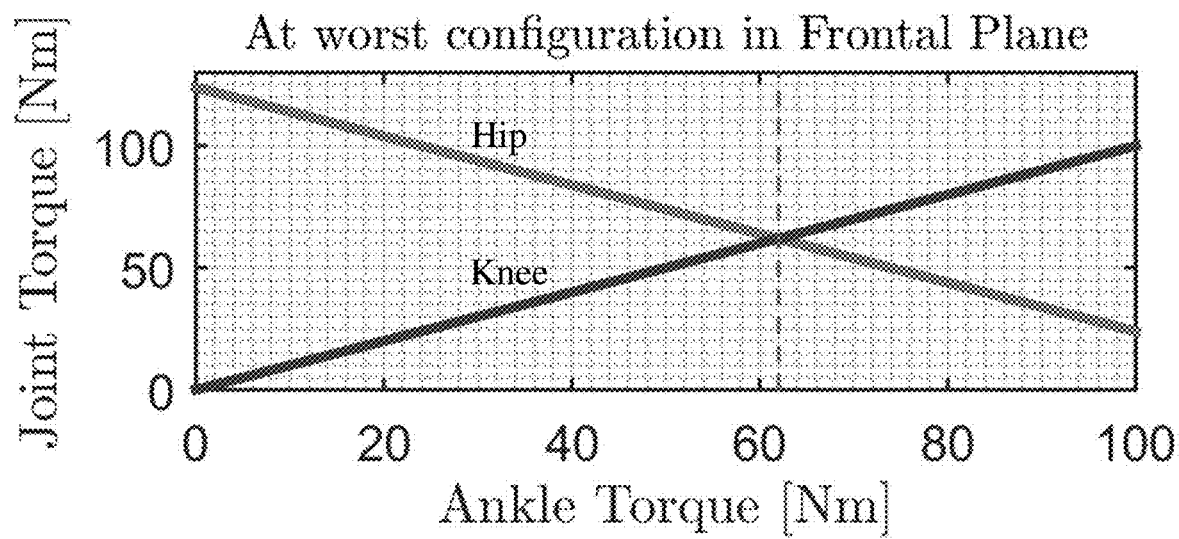
FIG. 10 is a graph of hip and knee joint torques versus ankle torque during a frontal squat of a robotic system.

Turning again to FIGS. 5 and 6, the forces and torques present during a squat with in the sagittal and frontal orientations are analyzed. FIG. 5 depicts a robotic system with robotic limbs oriented in a direction that is parallel to a sagittal plane of a user. With the linkage geometry already specified, kinematic and force analyses may be performed for squatting motions in the sagittal (side view) plane, when the knees are pointed back which may prevent collisions with the operator. In contrast to the sagittal plane squat, in a frontal plane squat as shown in FIG. 6, the robotic system's knees may be pointed laterally outward such that the robotic limbs are oriented outwards away from the robotic system in a direction that is parallel to a frontal plane of a user. Assuming symmetrical weight distribution on the robotic limbs, the Jacobians for the individual robotic limbs were determined for both the sagittal and frontal squat configurations. It was found from comparing the solutions for these different configurations that the frontal plane squat joint torques were generally smaller than the corresponding joint torques during a sagittal squat. Thus, during a transition between a standing and crouching or between a standing and crawling configuration, it may be desirable for the robotic limbs to be oriented to perform a frontal plane squat as described above. Further, due to the closed-loop kinematic chain formed by the robotic limbs during the frontal plane squat, the robotic limbs may generate internal forces and moments that do not influence the static balance. Therefore, in some embodiments, a number of different joint torques may be used to provide a stable squat, and the corresponding solutions may be optimized to provide the lowest maximum joint torque for the overall robotic system during a squat. Such an analysis is illustrated in FIG. 10 where hip and knee torques were calculated for different ankle torques while the robotic system was in a configuration where maximum torque was experienced during a frontal plane squat. In the depicted graph, the optimized set of joint torques was about 62 Newton-meters for each joint.

Figure 11:
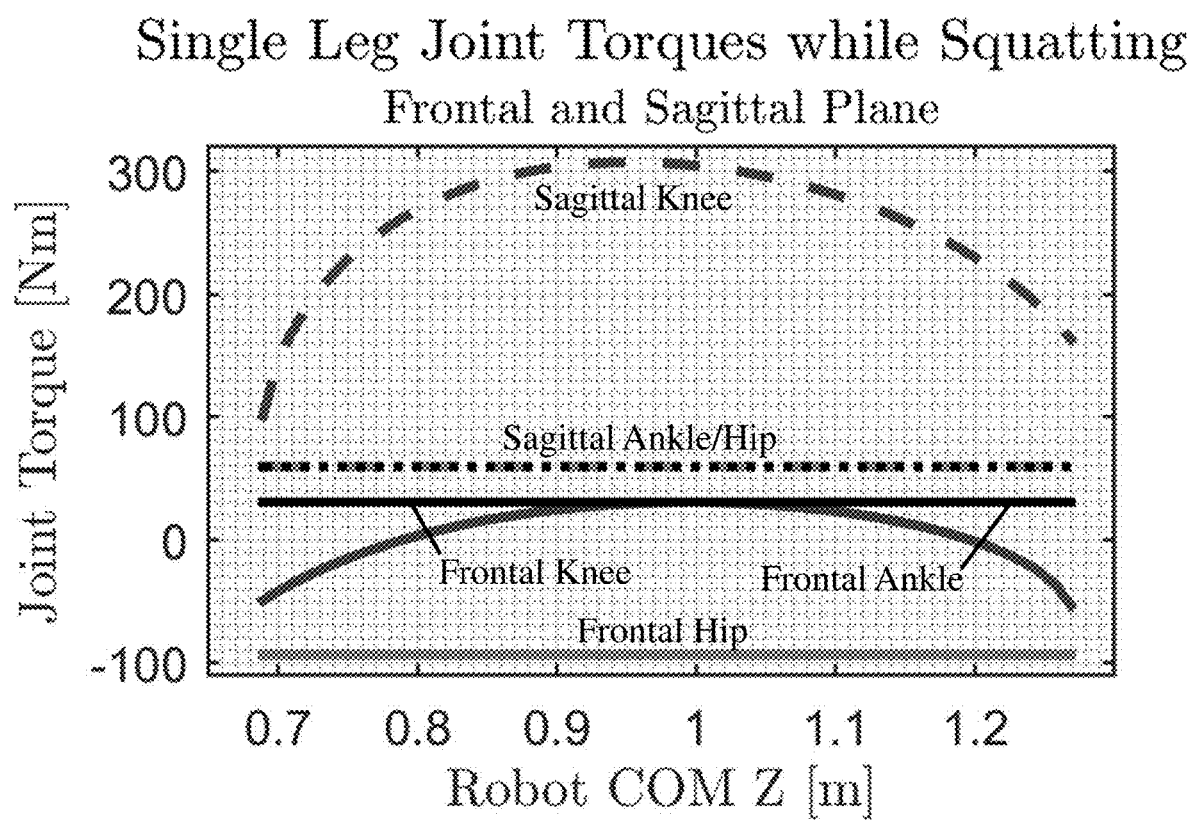
FIG. 11 is a graph comparing measured single leg joint torques while performing a frontal squat and a sagittal squat.

A graph illustrating the force comparison for a frontal and sagittal plane squats is provided in FIG. 11 which depicts measured hip, knee, and ankle torques versus robot center of mass (COM) height in a vertical Z direction of a robotic system. In the figures, the dashed and dotted lines show the joint torques required for a single leg when both legs are in contact with the ground, the robot is level, standing directly over its ankle, and performing a squatting motion with its knees in the sagittal configuration. FIG. 11 also shows the joint torques applied in a single leg for the robot to squat when it is standing centered and level, with its knees in the frontal configuration and its ankles shoulder-width apart. In order to prevent the foot from lifting off the ground, the ankle torque was specified to be half the gravitational load times the expected width of the foot. The lengths of the first and second limb segments were chosen with the worst-case assumption that the operator is a 97.5th percentile American male with a height of 194.31 centimeters (6 feet 4.5 inches). During the sagittal squat, the constant 59 Newton-meters that the hip and ankle applied comes from the assistive upward force that was applied to the operator. The robot also applied a rearing torque to be able to apply that assistance force to the operator's center of mass. The knee saw a peak torque of 307 Newton-meters at its most kinematically unfavorable configuration in a mid-squat configuration when the first limb segment was oriented horizontal relative to ground. Designing a robot to be able to apply these loads, let alone transfer all of the load to one leg in order to lift the other and take a step, would likely necessitate the use of powerful actuators and/or heavy gearing. In contrast, during the frontal squat, the joint torques were redistributed, with the hip and ankle applying constant torques of −93.4 Newton-meters and 30.5 Newton-meters, respectively, to offset the torque applied by the knee to a peak of 30.5 Newton-meters. Note that the magnitudes of these joint torques were less than the peak torque applied by the knee during the sagittal plane squat, confirming the insights from the prior analytical analysis. Accordingly, by using a frontal plane strategy for squatting, a robotic system may exploit the closed-chain kinematics to significantly reduce the actuation torque requirements when squatting and providing an assistive load as shown by the drastically reduced torques in FIG. 11 during a frontal plane squat.

Example: Stairs

Another extreme mode of operation that a robotic system may be subjected to may include the force exertion that occurs when a user is climbing a set of stairs. The maximum allowable height of a stair according to the International Residential Code is 19.7 centimeters (7.750 inches). To allow for inconsistencies in stair height, a stair height of 20.3 centimeters (8 inches) was assumed. Thus, an ankle-joint-to-foot-tip length of 8 inches may be appropriate for use in such an application where the foot may be rotated downward into a tiptoe like configuration to extend a height of the associated robotic limb while traversing stairs.

Figure 12:
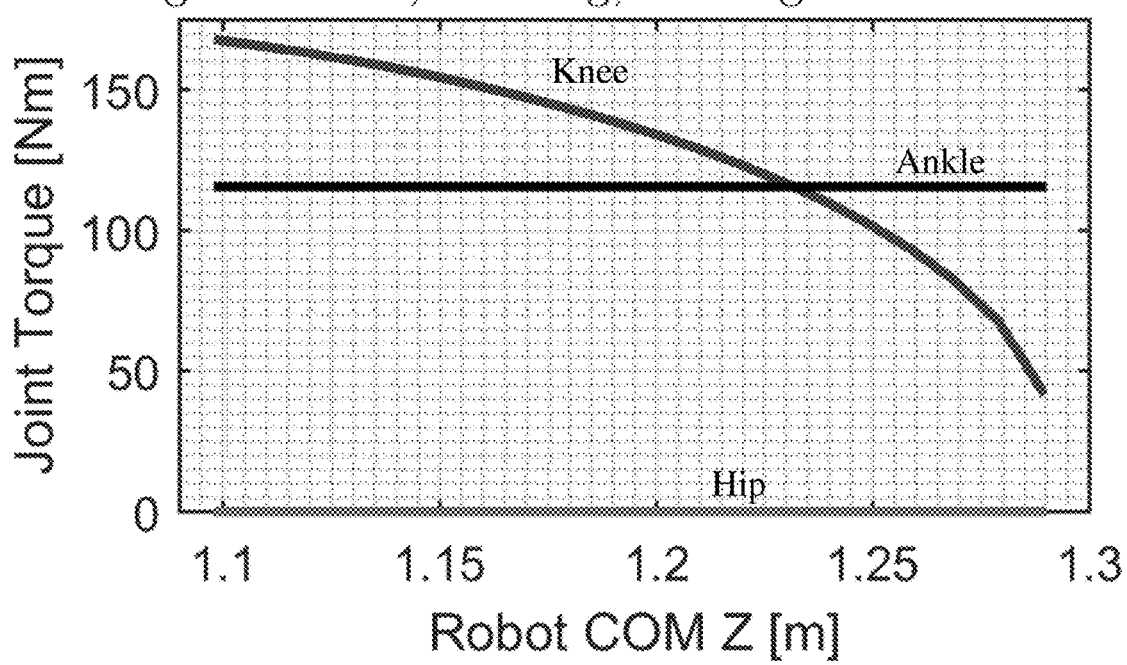
FIG. 12 is a graph of single leg joint torques while climbing a stair.

The gravitational load the robot may bear while performing these maneuvers was calculated to be less than when squatting. Specifically, a load of 578.3 Newtons (130 pounds-force) was calculated because only the robot's mass and the payload are borne while standing, and no upward assistive load to the operator was assumed. Instead, the entire gravitational load was borne by one robotic limb at a time while the other robotic limb was moved to the next step. Because a robot will likely transition to climbing stairs from a standing or walking configuration, knee and ankle torques during upward and forward motion were analyzed using a sagittal plane model. Meanwhile the hip torque required to hold up the torso and flight-phase leg was analyzed using a modified frontal plane model. Ultimately, the maximum loading conditions occurred when the robot was standing and climbing up a stair with one leg on the ground. When raising a foot and beginning to climb a step, the maximum knee torque was calculated to be 168 Newton-meters, and the maximum ankle torque was calculated to 115.6 Newton-meters when leaning forward 20 centimeters. With a hip width of 35.56 centimeters (14 inches), the maximum hip torque applied to hold the torso up is 102.8 Newton-meters. These forces are illustrated further in FIG. 12 which presents a graph of the forces for the various joint torques experienced while climbing a stair with the legs oriented in a sagittal plane and a forward lean of 20 cm.

Example: Actuator Prototype

A robotic system was made that included robotic limbs constructed using commercially available high-torque brushless motors from "Hoverboard" self-balancing scooters and differential mechanisms at each joint. The 15-pole brushless outrunner "Hoverboard" motors were inexpensive, had built-in hall-effect sensors, and had a torque constant of 0.45 Newton-meters/Amp while exhibiting little cogging torque. The motors also had built-in deep-groove roller bearings which allowed the motors to withstand large moments when cantilevered by its mounting shaft. The 2.2 kilograms weight of each motor was reduced by machining excess material used to encapsulate the tire off of the motors. The motors were verified to output 22.5 Newton-meters at 50 Amps with no saturation. These motors were selected for their low price, high torque constant, and availability. Six RoboteQ HBL2360 Dual-Channel Brushless Motor Controllers, which can source 50 Amps continuous and 75 Amps peak, were used to drive and control these motors.

To support the expected loads, a single motor at the knee would require a 7.47:1 gear reduction which could require multiple transmission stages. Therefore, in order to further reduce the amount of gearing in the system, a differential mechanism was used at each joint. Two motors were then connected to the corresponding left and right input shafts of the differentials using a chain-drive transmission. The input shafts were coupled to the output shaft of the differential via KHK Spiral Miter Gears. As the two motors rotate in opposite directions, the output shaft coming out of the middle spiral miter gear rotated about its centerline. Rotation of the two motors in the same direction generated a rotation of the entire output shaft about the centerline of both inputs. Therefore, rather than having one motor for each degree of freedom, both motors' combined torques may be applied to control motion of the system in a single degree of freedom, doubling the effective torque. The result was a compact but stiff 2-DOF joint that allowed the joint torque to be distributed between two motors while using half of the gearing.

Example: Robotic System Prototype

The structural components of the above described differential mechanism were fabricated on a CNC milling machine using the Protolabs Firstcut service. Each motor was modified by removing the rubber tire, adding a diametrically polarized magnet to the output side to measure an angular position of the motor with a magnetic encoder, and adding a 15-tooth #35 chain drive sprocket to the side closest to the mounting shaft for coupling with the input shafts of the corresponding differential mechanism.

The prototype robotic system included limb segments cut from carbon fiber tube. The structural base of the system was made from 8020 modular aluminum extrusion to allow for rapid development during testing. Clamping interface components made of aluminum were cut using a waterjet. Using these components and the above described actuators, the assembled prototype robotic system included joint and robotic limb layouts similar to those illustrated in the embodiment of FIG. 2. Initial experiments performed with the robotic system verified the functionality of the joint-level force and position control, as well as whole-body balance control using a high-stiffness ankle strategy.

The above results confirm the promise of the disclosed robotic systems to augment a user's ability to carry a heavy payload as well as helping a user transition to and maintain difficult postures. Accordingly, it is expected that the disclosed system may be used to supplement current personal protective equipment worn by hazardous materials response teams and allow them to perform their jobs more effectively in addition to other possible applications. Additionally, by using two articulated robotic limbs that may be operated independently from the operator's kinematics, it is possible to exploit favorable configurations of the robotic system, even when the operator is in an unfavorable posture. Assistive forces may also be applied to the user when transitioning between different postures. By assuming favorable configurations of the robotic limbs in different operating modes it is also possible to distribute the joint torques amongst the different actuators which may enable the use of lower gear ratios in a system. The differential mechanisms used in the prototype may also permit the combination of inputs from multiple actuators into a single degree of freedom which may again reduce the gearing needed to bear the heavy loads during operation. In combination, these design features may provide a near direct-drive actuation architecture such that the resultant prototype may bear and squat with heavy loads while allowing for high bandwidth force control.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A robotic system comprising:
a first robotic limb and a second robotic limb, wherein the first and second robotic limbs are configured to be attached to a user's body, wherein, when the robotic system is worn, the first and second robotic limbs are configured to extend towards and contact a surface proximate the user to support a load applied to the robotic system relative to the surface, wherein each of the first and second robotic limbs comprises:
a first limb segment with a first length; and
a second limb segment with a second length, wherein the first limb segment is selectively movable between a first position and a second position relative to the second limb segment, wherein when the first limb segments of the first and second robotic limbs are located in the first position the robotic system is configured to support the load when the user is in a first posture relative to the surface, and wherein when the first limb segments of the first and second robotic limbs are in the second position the robotic system is configured to support the load when the user is in a second posture relative to the surface,
wherein the first limb segment is rotatable relative to the second limb segment to move the first limb segment between the first and second positions.

2. The robotic system of claim 1, wherein the first and second positions correspond to configurations of the robotic system associated with increased mechanical advantage relative to configurations between the first and second positions.

3. The robotic system of claim 1, wherein the load includes at least a portion of the user's weight and/or at least a portion of a payload's weight.

4. The robotic system of claim 1, wherein a ratio of the first length to the second length is between or equal to 0.125 and 0.5.

5. The robotic system of claim 4, wherein the first length is between or equal to 5 inches and 20 inches, and a maximum combined length of the first length and the second length is between or equal to 40 inches and 60 inches.

6. The robotic system of claim 1, wherein the first robotic limb and the second robotic limb are configured to walk across the surface.

7. The robotic system of claim 1, further comprising one or more sensors configured to detect movement of the user relative to the robotic system and a controller operatively coupled to the first and second robotic limbs and the one or more sensors, wherein in response to the one or more sensors detecting movement of the user relative to the robotic system, the controller controls the first and second robotic limbs to walk the robotic system across the surface in sync with the user.

8. The robotic system of claim 1, wherein in at least one operating mode the first robotic limb and the second robotic limb are disposed within a plane parallel to a frontal plane of the user when worn.

9. A method for supporting a load with a robotic system attached to a user's torso, the method comprising:
supporting the load with at least first and second robotic limbs in contact with a surface proximate the user; and
rotating a first limb segment of each robotic limb relative to a second limb segment of each robotic limb from a first position to a second position when the user transitions between a first posture relative to the surface and a second posture relative to the surface.

10. The method of claim 9, wherein the first and second positions correspond to configurations of the robotic system associated with increased mechanical advantage relative to configurations between the first and second positions.

11. The method of claim 9, wherein the load includes at least a portion of the user's weight and/or at least a portion of a payload's weight.

12. The method of claim 9, wherein a ratio of a first length of the first limb segment to a second length of the second limb segment is between or equal to 0.125 and 0.5.

13. The method of claim 12, wherein the first length is between or equal to 5 inches and 20 inches, and a maximum combined length of the first length and the second length is between or equal to 40 inches and 60 inches.

14. The method of claim 9, further comprising actuating the first and second robotic limbs to walk the robotic system across the surface.

15. The method of claim 9, further comprising controlling the two or more robotic limbs to move the robotic system across the surface in sync with the user in response to movement of the user relative to the robotic system.

16. A robotic system comprising:
at least first and second robotic limbs configured to be attached to a user's body, wherein, when the robotic system is worn, the first and second robotic limbs are configured to extend towards and contact a surface proximate the user to support a load applied to the robotic system relative to the surface, wherein in at least one operating mode the first robotic limb and the second robotic limb are disposed within a plane parallel to a frontal plane of the user when worn,
wherein each of the first and second robotic limbs comprises a first limb segment and a second limb segment, wherein the first limb segment is selectively rotatable between a first position and a second position relative to the second limb segment.

17. The robotic system of claim 16, wherein the load includes at least a portion of the user's weight and/or at least a portion of a payload's weight.

18. The robotic system of claim 16, wherein the first robotic limb and the second robotic limb are configured to walk across the surface.

19. The robotic system of claim 16, further comprising one or more sensors configured to detect movement of the user relative to the robotic system and a controller operatively coupled to the first and second robotic limbs and the one or more sensors, wherein in response to the one or more sensors detecting movement of the user relative to the robotic system, the controller controls the two or more robotic limbs to move the robotic system across the surface in sync with the user.

20. The robotic system of claim 16, wherein the first robotic limb and the second robotic limb are located on opposing sides of a mid-sagittal plane of the user when worn.

21. The robotic system of claim 16, further comprising a base configured to be attached to the user's torso, wherein each of the first robotic limb and the second robotic limb include a first actuator operatively coupled to the base and a second actuator operatively coupled to the first limb segment, wherein the first limb segment is operatively coupled to and extends from the first actuator, and wherein the second limb segment is operatively coupled to and extends from the second actuator.

22. The robotic system of claim 16, wherein the first robotic limb and the second robotic limb are selectively moveable between a first configuration in which the first and second limbs are disposed within the plane parallel to a frontal plane of the user when worn and a second configuration in which each of the first and second limbs is disposed within a plane parallel to a sagittal plane of the user when worn.

23. The robotic system of claim 22, wherein the first and second robotic limbs are in the first configuration when the robotic limbs transition to a crouching or crawling configuration.

24. A robotic system comprising:
a base configured to be attached to a user's body;
a first robotic limb and a second robotic limb, wherein, when the robotic system is worn, the first and second robotic limbs are configured to extend towards and contact a surface proximate the user to support a load applied to the robotic system relative to the surface, wherein each of the first and second robotic limbs comprises:
a first actuator operatively coupled to the base;
a first limb segment operatively coupled to the first actuator;
a second actuator operatively coupled to the first limb segment; and
a second limb segment operatively coupled to the second actuator, wherein the second limb segment is selectively rotatable relative to the first limb segment.

25. The robotic system of claim 24, wherein the load includes at least a portion of the user's weight and/or at least a portion of a payload's weight.

26. The robotic system of claim 24, wherein a ratio of a first length of the first limb segment to a second length of the second limb segment is between or equal to 0.125 and 0.5.

27. The robotic system of claim 26, wherein the first length is between or equal to 5 inches and 20 inches, and a maximum combined length of the first length and the second length is between or equal to 40 inches and 60 inches.

28. The robotic system of claim 24, wherein the first robotic limb and the second robotic limb are configured to walk across the surface.

29. The robotic system of claim 24, further comprising one or more sensors configured to detect movement of the user relative to the robotic system and a controller operatively coupled to the first and second robotic limbs and the one or more sensors, wherein in response to the one or more sensors detecting movement of the user relative to the robotic system, the controller controls the first and second robotic limbs to move the robotic system across the surface in sync with the user.

30. The robotic system of claim 24, wherein in at least one operating mode the first robotic limb and the second robotic limb are disposed within a plane parallel to a frontal plane of the user when worn.

31. The robotic system of claim 24, wherein the first robotic limb and the second robotic limb are located on opposing sides of a mid-sagittal plane of the user when worn.

32. The robotic system of claim 24, wherein the first actuator and the second actuator are configured to rotate an attached limb segment about an axis substantially parallel to a longitudinal axis of the attached limb segment and/or an axis that is substantially transverse to the longitudinal axis of the attached limb segment.

33. A robotic system comprising:
a base configured to be attached to a user's body;
a first robotic limb and a second robotic limb, wherein, when the robotic system is worn, the first and second robotic limbs are configured to extend towards and contact a surface proximate the user to support a load applied to the robotic system relative to the surface, wherein each of the first and second robotic limbs comprises:
a first actuator operatively coupled to the base;
a first limb segment operatively coupled to the first actuator;
a second actuator operatively coupled to the first limb segment; and
a second limb segment operatively coupled to the second actuator,
wherein each of the first and second robotic limbs further comprises a third actuator operatively coupled to the second limb segment and a third limb segment operatively coupled to the third actuator.

34. The robotic system of claim 33, wherein the load includes at least a portion of the user's weight and/or at least a portion of a payload's weight.

35. The robotic system of claim 33, wherein a ratio of a first length of the first limb segment to a second length of the second limb segment is between or equal to 0.125 and 0.5.

36. The robotic system of claim 35, wherein the first length is between or equal to 5 inches and 20 inches, and a maximum combined length of the first length and the second length is between or equal to 40 inches and 60 inches.

37. The robotic system of claim 33, wherein the first robotic limb and the second robotic limb are configured to walk across the surface.

38. The robotic system of claim 33, further comprising one or more sensors configured to detect movement of the user relative to the robotic system and a controller operatively coupled to the first and second robotic limbs and the one or more sensors, wherein in response to the one or more sensors detecting movement of the user relative to the robotic system, the controller controls the first and second robotic limbs to move the robotic system across the surface in sync with the user.

39. The robotic system of claim 33, wherein in at least one operating mode the first robotic limb and the second robotic limb are disposed within a plane parallel to a frontal plane of the user when worn.

40. The robotic system of claim 33, wherein the first robotic limb and the second robotic limb are located on opposing sides of a mid-sagittal plane of the user when worn.

41. The robotic system of claim 33, wherein the first actuator and the second actuator are configured to rotate an attached limb segment about an axis substantially parallel to a longitudinal axis of the attached limb segment and/or an axis that is substantially transverse to the longitudinal axis of the attached limb segment.

* * * * *